US012623830B2

(12) United States Patent　　　(10) Patent No.:　US 12,623,830 B2
Nilsen et al.　　　　　　　　　　　　(45) Date of Patent:　　May 12, 2026

(54) SYSTEM SUITABLE FOR STORING AND/OR TRANSPORTING TEMPERATURE-SENSITIVE MATERIALS

(71) Applicant: Cold Chain Technologies, LLC, Franklin, MA (US)

(72) Inventors: James Nilsen, Ocean City, NJ (US); Lucine Michelle Sabounjian, Wethersfield, CT (US); Mark Fontes, North Scituate, RI (US); Ali Moghaddas, Westwood, MA (US)

(73) Assignee: COLD CHAIN TECHNOLOGIES, LLC, Franklin, MA (US)

( * ) Notice: Subject to any disclaimer, the term of this patent is extended or adjusted under 35 U.S.C. 154(b) by 28 days.

(21) Appl. No.: 18/085,136

(22) Filed: Dec. 20, 2022

(65) Prior Publication Data

US 2023/0227236 A1　　Jul. 20, 2023

Related U.S. Application Data

(60) Provisional application No. 63/291,503, filed on Dec. 20, 2021.

(51) Int. Cl.
B65D 81/38　　　(2006.01)
B65D 25/04　　　(2006.01)
(Continued)

(52) U.S. Cl.
CPC ......... B65D 81/3827 (2013.01); B65D 25/04 (2013.01); B65D 25/30 (2013.01);
(Continued)

(58) Field of Classification Search
CPC .... B65D 81/3827; B65D 25/04; B65D 25/30; B65D 43/0202; B65D 51/24; B65D 81/18;
(Continued)

(56) References Cited

U.S. PATENT DOCUMENTS 1,843,038 A　　1/1932　McIlvain
2,034,114 A　　3/1936　Moody
(Continued)

FOREIGN PATENT DOCUMENTS

CN　　204822615 U　　12/2015
CN　　205312237 U　　6/2016
(Continued)

OTHER PUBLICATIONS

English translation of EP 2883812, the primary prior art in Office Action from Applicant IDS (Year: 2015).*
(Continued)

*Primary Examiner* — Don M Anderson
*Assistant Examiner* — Eric C Baldrighi
(74) *Attorney, Agent, or Firm* — KRIEGSMAN & KRIEGSMAN

(57)　　　　　ABSTRACT

System suitable for storing and/or transporting temperature-sensitive materials. In a preferred embodiment, the system may include a cooler made of expanded polystyrene foam. The cooler may include a base and a lid. The base may be a unitary structure that includes a cavity bounded by a bottom wall and four side walls. The base also may include an integral support that may include a platform elevated from the bottom wall, as well as a stanchion extending upwardly from the bottom wall along each of the side walls. The support may be constructed to removably receive a product box in the cavity and to orient the product box at an angle offset from the cavity. Dry ice pellets may be positioned around and under the product box, and additional dry ice pellets may be positioned in a tray mounted on the stanchions over the product box.

32 Claims, 36 Drawing Sheets

(51) Int. Cl.

| | |
|---|---|
| *B65D 25/30* | (2006.01) |
| *B65D 43/02* | (2006.01) |
| *B65D 51/24* | (2006.01) |
| *B65D 81/18* | (2006.01) |
| *G01D 9/00* | (2006.01) |

(52) U.S. Cl.

CPC ......... *B65D 43/0202* (2013.01); *B65D 51/24* (2013.01); *B65D 81/18* (2013.01); *G01D 9/007* (2021.05)

(58) Field of Classification Search

CPC ...... B65D 5/0254; B65D 5/2057; B65D 5/22; B65D 5/4612; B65D 5/48016; B65D 25/107; B65D 51/28; G01D 9/007; G01K 1/14; G01K 3/005

USPC .................................................. 220/592.25

See application file for complete search history.

(56) References Cited

U.S. PATENT DOCUMENTS

| | | | |
|---|---|---|---|
| 2,289,060 A | 7/1942 | Merkle | |
| 2,317,005 A | 4/1943 | Wasserman | |
| 2,467,268 A | 4/1949 | Merkle | |
| 2,844,299 A | 7/1958 | Kessler et al. | |
| 3,365,092 A | 1/1968 | Blessing | |
| 3,810,367 A | 5/1974 | Peterson | |
| 4,134,276 A | 1/1979 | Lampard | |
| 4,145,895 A | 3/1979 | Hjertstrand et al. | |
| 4,206,616 A | 6/1980 | Frank et al. | |
| 4,294,079 A | 10/1981 | Benson et al. | |
| 4,344,301 A | 8/1982 | Taylor | |
| 4,446,705 A | 5/1984 | Loucks | |
| 4,498,312 A | 2/1985 | Schlosser | |
| 4,576,017 A | 3/1986 | Combs et al. | |
| 4,614,091 A | 9/1986 | Frank et al. | |
| 4,682,708 A | 7/1987 | Pool | |
| 4,819,793 A | 4/1989 | Willard et al. | |
| 4,947,658 A | 8/1990 | Wheeler et al. | |
| 5,042,260 A | 8/1991 | George, Sr. | |
| 5,216,900 A | 6/1993 | Jones | |
| 5,218,923 A | 6/1993 | LaRosa | |
| 5,598,713 A | 2/1997 | Bartilucci | |
| 5,671,611 A | 9/1997 | Quigley | |
| 5,899,088 A | 5/1999 | Purdum | |
| 5,924,302 A | 7/1999 | Derifield | |
| 6,055,825 A | 5/2000 | Choy | |
| 6,116,042 A | 9/2000 | Purdum | |
| 6,131,376 A | 10/2000 | Grey et al. | |
| 6,189,330 B1 | 2/2001 | Retallick et al. | |
| 6,233,965 B1 | 5/2001 | Choy | |
| 6,244,458 B1 | 6/2001 | Frysinger et al. | |
| 6,295,830 B1 | 10/2001 | Newman | |
| 6,349,559 B1 | 2/2002 | Hasanovic | |
| 6,482,332 B1 | 11/2002 | Malach | |
| 6,519,968 B1 | 2/2003 | Konarski | |
| 6,564,992 B1 | 5/2003 | Wegner | |
| 6,574,983 B2 | 6/2003 | Smith et al. | |
| 6,584,797 B1 | 7/2003 | Smith et al. | |
| 6,619,500 B1 | 9/2003 | Lantz | |
| 6,668,577 B2 | 12/2003 | Quenedey | |
| 6,755,568 B2 | 6/2004 | Malone et al. | |
| 6,868,982 B2 | 3/2005 | Gordon | |
| 6,875,486 B2 | 4/2005 | Miller | |
| 6,910,582 B2 | 6/2005 | Lantz | |
| 7,028,504 B2 | 4/2006 | Derifield | |
| 7,225,632 B2 | 6/2007 | Derifield | |
| 7,240,513 B1 | 7/2007 | Conforti | |
| 7,257,963 B2 | 8/2007 | Mayer | |
| 7,607,540 B2 | 10/2009 | Ballard | |
| 7,624,873 B2 | 12/2009 | Tennant et al. | |
| 7,681,405 B2 | 3/2010 | Williams | |
| 7,849,708 B2 | 12/2010 | Goncharko et al. | |
| 8,074,465 B2 | 12/2011 | Heroux et al. | |
| 8,152,367 B2 | 4/2012 | Roberts et al. | |
| 8,176,749 B2 | 5/2012 | LaMere et al. | |
| 8,250,882 B2* | 8/2012 | Mustafa ............ B65D 81/3862 62/457.2 |
| 8,292,119 B2 | 10/2012 | Kenneally | |
| 8,499,533 B2 | 8/2013 | Emond et al. | |
| 8,567,211 B2 | 10/2013 | Al-Rasheed | |
| 8,580,369 B2 | 11/2013 | Emond et al. | |
| 8,607,581 B2 | 12/2013 | Williams et al. | |
| 8,613,202 B2 | 12/2013 | Williams | |
| 8,763,811 B2 | 7/2014 | Lantz | |
| 8,863,546 B2 | 10/2014 | Oberweis | |
| 8,887,515 B2 | 11/2014 | Patstone | |
| 8,904,810 B2 | 12/2014 | Schabron et al. | |
| 8,938,986 B2 | 1/2015 | Matta et al. | |
| 9,045,278 B2 | 6/2015 | Mustafa et al. | |
| 9,060,508 B2 | 6/2015 | Anti et al. | |
| 9,139,319 B2 | 9/2015 | Crespo et al. | |
| 9,180,998 B2 | 11/2015 | Banks et al. | |
| 9,366,469 B2 | 6/2016 | Chapman, Jr. | |
| 9,429,350 B2 | 8/2016 | Chapman, Jr. | |
| 9,550,618 B1 | 1/2017 | Jobe | |
| 9,611,067 B2 | 4/2017 | Collison | |
| 9,689,602 B2 | 6/2017 | Emond et al. | |
| 9,828,165 B2 | 11/2017 | Ranade et al. | |
| 9,834,365 B2 | 12/2017 | Pointer et al. | |
| 9,909,797 B2 | 3/2018 | Van Wuffen | |
| 9,944,449 B2 | 4/2018 | Wood et al. | |
| 9,957,099 B2 | 5/2018 | White et al. | |
| 9,963,287 B2 | 5/2018 | Vogel et al. | |
| 9,981,797 B2 | 5/2018 | Aksan et al. | |
| 9,994,385 B2 | 6/2018 | Dudi et al. | |
| 10,046,901 B1 | 8/2018 | Jobe | |
| 10,104,876 B2 | 10/2018 | Garland et al. | |
| 10,119,741 B2 | 11/2018 | Jackson et al. | |
| 10,168,090 B1 | 1/2019 | Chapman, Jr. | |
| 10,253,918 B2 | 4/2019 | McCormick | |
| 10,273,073 B2 | 4/2019 | Collison | |
| 10,279,991 B2 | 5/2019 | Roger et al. | |
| 10,309,709 B2 | 6/2019 | Emond et al. | |
| 10,443,918 B2 | 10/2019 | Li et al. | |
| 10,457,469 B2 | 10/2019 | Tumber et al. | |
| 10,568,808 B2 | 2/2020 | Ferracamo, Jr. | |
| 10,583,978 B2 | 3/2020 | Longley et al. | |
| 10,604,326 B2 | 3/2020 | Longley et al. | |
| 10,618,695 B2 | 4/2020 | McCormick | |
| 10,661,969 B2 | 5/2020 | Pranadi et al. | |
| 10,766,685 B2 | 9/2020 | Kuhn et al. | |
| 10,767,915 B2 | 9/2020 | Wickline | |
| 10,899,529 B2 | 1/2021 | MokhtarzadehBahadorani | |
| 10,941,977 B2 | 3/2021 | Waltermire et al. | |
| 10,962,270 B2 | 3/2021 | Jain et al. | |
| 11,078,008 B2 | 8/2021 | Dankbaar et al. | |
| 11,085,688 B2 | 8/2021 | Seo et al. | |
| 11,130,622 B2 | 9/2021 | Goellner | |
| 11,137,190 B2 | 10/2021 | Martino | |
| 11,340,005 B2 | 5/2022 | Nilsen et al. | |
| 11,472,625 B2 | 10/2022 | Mirzaee Kakhki | |
| 11,499,770 B2 | 11/2022 | Rizzo et al. | |
| 11,511,928 B2 | 11/2022 | Rizzo et al. | |
| 11,518,602 B2 | 12/2022 | Knight | |
| 11,731,826 B2 | 8/2023 | Blezard et al. | |
| 11,953,262 B2 | 4/2024 | Blezard et al. | |
| 2002/0124588 A1 | 9/2002 | Quenedy | |
| 2005/0178142 A1 | 8/2005 | Perry et al. | |
| 2006/0053828 A1 | 3/2006 | Shallman et al. | |
| 2006/0218963 A1 | 10/2006 | Elias | |
| 2007/0028642 A1* | 2/2007 | Glade .................... A61B 90/98 62/457.2 |
| 2007/0051782 A1 | 3/2007 | Lantz | |
| 2007/0084232 A1 | 4/2007 | Whewell, Jr. | |
| 2007/0193298 A1 | 8/2007 | Derifield | |
| 2008/0223066 A1 | 9/2008 | Henderson et al. | |
| 2008/0292220 A1 | 11/2008 | Zacchi | |
| 2009/0001086 A1 | 1/2009 | Roderick et al. | |
| 2009/0179541 A1 | 7/2009 | Smith et al. | |
| 2009/0230139 A1 | 9/2009 | Li | |
| 2010/0162734 A1 | 7/2010 | McCormick et al. | |

(56) References Cited

U.S. PATENT DOCUMENTS

| | | | |
|---|---|---|---|
| 2010/0289669 A1* | 11/2010 | Saltzman | H04Q 9/00 |
| | | | 340/870.17 |
| 2011/0290792 A1 | 12/2011 | Krzak et al. | |
| 2012/0248101 A1 | 10/2012 | Tumber et al. | |
| 2013/0020309 A1 | 1/2013 | Tattam et al. | |
| 2013/0055750 A1 | 3/2013 | Mustafa et al. | |
| 2013/0228583 A1 | 9/2013 | Mayer | |
| 2014/0059978 A1 | 3/2014 | Bolejack et al. | |
| 2014/0157797 A1* | 6/2014 | Kovalick | F25D 3/06 |
| | | | 62/371 |
| 2015/0259126 A1 | 9/2015 | McGoff et al. | |
| 2015/0285548 A1 | 10/2015 | Emond et al. | |
| 2016/0362240 A1 | 12/2016 | Ferracamo, Jr. | |
| 2017/0001785 A1 | 1/2017 | Ripley et al. | |
| 2017/0121097 A1* | 5/2017 | Pranadi | B65D 19/06 |
| 2017/0146276 A1 | 5/2017 | Newman | |
| 2017/0198959 A1 | 7/2017 | Morris | |
| 2017/0245486 A1 | 8/2017 | Larson et al. | |
| 2017/0284723 A1 | 10/2017 | Newman | |
| 2017/0305632 A1 | 10/2017 | Brown | |
| 2017/0350635 A1 | 12/2017 | Thirumurugavel | |
| 2018/0086534 A1 | 3/2018 | Kilmer et al. | |
| 2018/0134427 A1 | 5/2018 | Fallgren | |
| 2018/0194535 A1 | 7/2018 | Collison | |
| 2018/0328644 A1 | 11/2018 | Rizzo et al. | |
| 2018/0347887 A1* | 12/2018 | Kenneally | F25D 3/125 |
| 2018/0353379 A1 | 12/2018 | Chou et al. | |
| 2019/0226744 A1 | 7/2019 | Wood et al. | |
| 2020/0002075 A1 | 1/2020 | Lee et al. | |
| 2020/0003629 A1* | 1/2020 | Casoli | G01K 1/14 |
| 2020/0122909 A1 | 4/2020 | Jobe | |
| 2020/0206082 A1 | 7/2020 | Ferracamo, Jr. | |
| 2020/0231362 A1 | 7/2020 | Kulangara et al. | |
| 2020/0262637 A1 | 8/2020 | Tattam | |
| 2020/0307896 A1 | 10/2020 | Pranadi et al. | |
| 2020/0346840 A1 | 11/2020 | Munie et al. | |
| 2020/0378676 A1 | 12/2020 | Rowe et al. | |
| 2021/0016955 A1 | 1/2021 | Morine et al. | |
| 2021/0070539 A1 | 3/2021 | Chasteen et al. | |
| 2021/0253292 A1 | 8/2021 | Reyes | |
| 2021/0253330 A1 | 8/2021 | Madanagopal et al. | |
| 2021/0254877 A1 | 8/2021 | Massenzo et al. | |
| 2021/0300665 A1 | 9/2021 | Melchor | |
| 2021/0309442 A1 | 10/2021 | Kletzel et al. | |
| 2022/0002070 A1 | 1/2022 | Moghaddas et al. | |
| 2022/0194682 A1 | 6/2022 | Michel et al. | |
| 2022/0265514 A1 | 8/2022 | Blezard et al. | |
| 2022/0267081 A1 | 8/2022 | Conway et al. | |
| 2022/0267657 A1 | 8/2022 | Blezard et al. | |
| 2022/0325938 A1 | 10/2022 | Nilsen et al. | |
| 2022/0333840 A1 | 10/2022 | Chasteen et al. | |
| 2022/0343270 A1 | 10/2022 | Melchor et al. | |
| 2023/0131560 A1 | 4/2023 | Blezard et al. | |
| 2023/0227236 A1 | 7/2023 | Nilsen et al. | |
| 2023/0249896 A1 | 8/2023 | Blezard | |
| 2023/0257185 A1 | 8/2023 | Goellner et al. | |
| 2024/0142153 A1 | 5/2024 | Emond et al. | |
| 2024/0343468 A1 | 10/2024 | Chasteen et al. | |

FOREIGN PATENT DOCUMENTS

| | | | |
|---|---|---|---|
| CN | 106081351 A | 11/2016 |
| CN | 210479596 U | 5/2020 |
| EP | 0940352 A2 | 9/1999 |
| EP | 2179648 B1 | 12/2014 |
| EP | 2883812 A1 | 1/2018 |
| EP | 3112289 B1 | 12/2018 |
| EP | B090961 B1 | 2/2019 |
| EP | 3270709 B1 | 5/2019 |
| EP | 3601095 B1 | 4/2021 |
| GB | 2566792 A | 3/2019 |
| WO | 9916330 A1 | 4/1999 |
| WO | 0144731 A1 | 6/2001 |
| WO | 2010044107 A2 | 4/2010 |
| WO | 2014125878 A1 | 8/2014 |
| WO | 2017220953 A1 | 12/2017 |
| WO | 2018075470 A1 | 4/2018 |
| WO | 2018213348 A2 | 11/2018 |
| WO | 2019059585 A1 | 3/2019 |
| WO | 2019091581 A1 | 5/2019 |
| WO | 2020157488 A1 | 8/2020 |
| WO | 2020193872 A1 | 10/2020 |
| WO | 2021165698 A1 | 8/2021 |

OTHER PUBLICATIONS

Screen captures from YouTube video entitled "Field Work: Data-Logger Set-Up", uploaded on Nov. 3, 2014 by SpeedyDoc # DOCARMY. Retrieved from Internet: https://www.youtube.com/watch?v=KFm5Sp0—G4 (Year: 2014).*

Screen Capture from YouTube video clip entitled "DEMO: Compostable Fiber To-Go Boxes". Uploaded on Apr. 23, 2015 by Good Start Packaging. Retrieved from internet: https://www.youtube.com/watch?v=InsZtq4-gxY (Year: 2015).*

WSFA 12 News Staff web page entitled "2 trays of Covid-19 vaccines sent to Alabama returned due to temperature drop," (2020); https://www.wsfa.com/2020/12/16/trays-covid-vaccines-sent-alabama-returned-due-temperature-drop/, accessed Feb. 6, 2024.

Biocair, Inc. web page entitled "What causes some dry ice shipments to reach -90.C?" (2017); https://www.biocair.com/latest/news/what-causes-some-dry-ice-shipments-to-reach-90-c, accessed Feb. 7, 2024.

Web page for TTx Thermal Inserts, The Illuminate Group, Tampa, Florida; https://theilluminategroup.com/products/ttx-thermal-packages/, accessed Feb. 7, 2024.

"Packaging Perishable Shipments," FedEx Corporation, Memphis, TN (2019).

Web page entitled "How to ship perishables," FedEx Corporation, Memphis, TN; https://www.fedex.com/en-us/shipping/how-to-ship-perishables.html, accessed Feb. 7, 2024.

Web page entitled "How Do I Ship Dry Ice," ShipStation, Austin, TX (2022); https://www.shipstation.com/blog/how-do-i-ship-dry-ice/, accessed Feb. 7, 2024.

Web page for Sub-Zero Ice Services, Miami, FL; https://subzeroiceservices.com/, accessed Feb. 7, 2024.

Web page for CrystalandCory.com; https://crystalandcomp.com/nutrisystem-frozen-food-delivery/, accessed Feb. 7, 2024.

Web page entitled "What Format of Dry Ice Does Your Home Delivery Logistics Need?"; https://www.just-food.com/contractors/cleaning-products-hygiene/cold-jet/pressreleases/format-dry-ice/, accessed Feb. 7, 2024.

"Thermosafe Multi-Purpose Dry Ice Mailers," thomassci.com. Accessed: Dec. 16, 2021. https://web.archive.org/web/20211216000810/https://www.thomassci.com/Laboratory-Supplies/Mailers/_/MULTI-PURPOSE-DRY-ICE-MAILERS?q=Dry+Ice+Container.

"Polar Tech," polar-tech.com. Accessed: Dec. 16, 2021. https://web.archive.org/web/20211216011453/https://www.polar-tech.com/wp-content/uploads/2019/10/Science_catalog.pdf.

"STS Frozen Parcel Family," coldchaintech.com. Apr. 15, 2016. https://web.archive.org/web/20160415191312/http://www.coldchaintech.com/product-details/sts/.

"Passive Packaging Solutions—Va-Q-tainer," fedex.com. Accessed: Dec. 16, 2021. https://web.archive.org/web/20211216005634/https://www.fedex.com/en-cn/shipping/industry-solutions/healthcare/temperature-control.html.

"Frozen Shippers GTS Extreme Family," coldchaintech.com. Jun. 12, 2016. https://web.archive.org/web/20160612102223/http://www.coldchaintech.com:80/product-details/gts-extreme.

"Dry ice storage containers," ddbiolab.com. Accessed: Dec. 16, 2021. https://web.archive.org/web/20211216002005/https://www.ddbiolab.com/frontoffice/product?produitId=0I-17-18.

"CRYOBOXX," cryoboxx.com. Accessed: Dec. 16, 2021. https://web.archive.org/web/20211216002709/https://www.cryoboxx.com/en/cryoboxx/.

"Therapak EPS (Expanded Polystyrene) Insulated Shippers for Refrigerated andFrozen Specimen Shipment," therapak.com. Jul.

(56)　　　　　　References Cited

OTHER PUBLICATIONS 28, 2018. https://web.archive.org/web/20180728115104/https://
therapak.com/catalog/insulated-shippers/.
"Initial International," sofrigam.com. Apr. 10, 2023. https://sofrigam.
com/en/product/89-initial-international.
"evo DI dry ice smart shipper" biolifesolutions.com; https://www.
biolifesolutions.com/cold-chain-management/evo-dry-ice-
shippers/.
"Sherpa Systems Dry Ice" pelibiothermal.com Oct. 13, 2021; https://
pelibiothermal.com/products/sherpa-systems-dry-ice.
"Ex-Temp Validated Boxes" marathonproducts.com Nov. 13, 2017;
https://marathonproducts.com/product/ex-temp-shipping-boxes/
1483571719208-13f78a46-84e6.
"Evertemp Urethane Insulated Shipping Containers" coldice.com
Feb. 17, 2015; https://www.coldice.com/insulated_shipping_
containers/.
Pack-out Sheet for Novartis GTS-77 Shipping System, Cold Chain
Technologies, Franklin, MA (2011).
Pack-out Sheet for GTS-77 Shipping System, Cold Chain Tech-
nologies, Franklin, MA (2010).
"below-zero Complete without Orange bio-bottle," BB: bio-bottle,
biobottle.com, SKU: BZOW1, 2018. https://www.bio-bottle.com/
shop /below-zero/below-zero-complete-withoutorange-pio-bottle/.
"Cold Chain Logistics Accessories: Cryoport Exclusive Accessories
Safepak®," Cryoport, cryoportj.com, 2018. https://www.cryoport.
com/servi ces/cold-chain-logistics-accessories.
"Simport Cryostore™ Storage Boxes," Thomas Scientific, thomassci.
com, 2018. https://www.thomassci.com/Laboratory-Supplies/Boxes/_/
CRYOSTORE-Storage-Boxes?q=Cryovial%20Storage%20Boxes.
"Packaging Requirements for Dry Ice," Standard Operating Proce-
dure, ehs.umich.edu, Rev.#2, Univ. of Michigan, Jun. 2, 2017.
https://ehs.umich.edu/wp-content/uploads/2018/04/Pkg- Req-Dry-
Ice.pdf.
Pack-out Sheet for CCT STS-U186-DIUL Shipping System, Cold
Chain Technologies, Franklin, MA (2011).

* cited by examiner

SYSTEM SUITABLE FOR STORING AND/OR TRANSPORTING TEMPERATURE-SENSITIVE MATERIALS

CROSS-REFERENCE TO RELATED APPLICATIONS

The present application claims the benefit under 35 U.S.C. 119(e) of U.S. Provisional Patent Application No. 63/291,503, inventors James Nilsen et al., filed Dec. 20, 2021, the disclosure of which is incorporated herein by reference.

BACKGROUND OF THE INVENTION

The present invention relates generally to systems suitable for storing and/or transporting temperature-sensitive materials and relates more particularly to a novel system suitable for storing and/or transporting temperature-sensitive materials.

There is a continuing need for systems that can maintain temperature-sensitive materials within a desired temperature range for an extended period of time. For example, many pharmaceuticals, biological materials, medical devices, foods, beverages, and other temperature-sensitive materials must be maintained within a particular temperature range (such as, for example, –90° C. to –60° C.; –25° C. to –15° C.; +2° C. to +8° C.; +15° C. to +25° C.) in order to prevent the spoilage of such materials. As can readily be appreciated, the maintenance of such materials within a desired temperature range while such materials are being transported and/or stored can be challenging. One way in which such temperature maintenance may be achieved is by transporting and/or storing such materials in active temperature-control devices, such as electrically-powered refrigeration units or the like. However, as can be appreciated, such active temperature-control devices add considerable expense to transportation and/or storage costs.

An alternative approach to temperature maintenance during transportation and/or storage is to place the temperature-sensitive materials within an insulated container that also contains one or more passive temperature-control members, such as, but not limited to, ice packs, gel packs, dry ice, wet ice, or the like. In some cases, such as where the passive temperature-control member is an ice pack or a gel pack, the passive temperature-control member typically comprises a quantity of a phase-change material (PCM) disposed within a suitable casing or container. In other cases, such as where the passive temperature-control member is dry ice or wet ice, the passive temperature-control member may be loose within the insulated container. Often, the temperature-sensitive materials are housed within a product box (sometimes alternatively referred to as "a payload box") that, in turn, is housed within the insulated container. The product box, which is typically made of a corrugated cardboard or similar material, is typically shaped to have four sides, a top, and a bottom defining a uniform rectangular prismatic cavity.

For example, in U.S. Pat. No. 6,868,982 B2, inventor Gordon, which issued Mar. 22, 2005, and which is incorporated herein by reference, there is disclosed an insulated shipping container and method of making the same. In a preferred embodiment, the insulated shipping container comprises an outer box, an insulated insert, an inner box and a closure member. The outer box, which is preferably made of corrugated fiberboard, comprises a rectangular prismatic cavity bounded by a plurality of rectangular side walls, a closed bottom end, and top closure flaps. The insulated insert is snugly, but removably, disposed within the outer box and is shaped to define a rectangular prismatic cavity bounded by a bottom wall and a plurality of rectangular side walls, the insulated insert having an open top end. The insulated insert is made of a foamed polyurethane body to which on all sides, except its bottom, a thin, flexible, unfoamed polymer bag is integrally bonded. The bag is a unitary structure having a generally uniform rectangular shape, the bag being formed by sealing shut one end of a tubular member with a transverse seam and forming longitudinal creases extending from opposite ends of the seam. The inner box, which is snugly, but removably, disposed within the insert, is preferably made of corrugated fiberboard and is shaped to include a rectangular prismatic cavity bounded by a plurality of rectangular side walls and a closed bottom end, the top end thereof being open. The closure member is a thick piece of foam material snugly, but removably, disposed in the open end of the inner box.

Documents that may be of interest may include the following, all of which are incorporated herein by reference: U.S. Pat. No. 11,511,928 B2 inventors Rizzo et al., which issued Nov. 29, 2022; U.S. Pat. No. 11,499,770 B2, inventors Rizzo et al., which issued Nov. 15, 2022; U.S. Pat. No. 11,472,625 B2, inventor Mirzaee Kakhki, which issued Oct. 18, 2022; U.S. Pat. No. 11,340,005 B2, inventors Nilsen et al., which issued May 24, 2022; U.S. Pat. No. 11,137,190 B2, inventor Martino, which issued Oct. 5, 2021; U.S. Pat. No. 10,962,270 B2, inventors Jain et al., which issued Mar. 30, 2021; U.S. Pat. No. 10,766,685 B2, inventors Kuhn et al., which issued Sep. 8, 2020; U.S. Pat. No. 10,661,969 B2, inventors Pranadi et al., which issued May 26, 2020; U.S. Pat. No. 10,618,695 B2, inventor McCormick, which issued Apr. 14, 2020; U.S. Pat. No. 10,604,326 B2, inventors Longley et al., which issued Mar. 31, 2020; U.S. Pat. No. 10,583,978 B2, inventors Longley et al., which issued Mar. 10, 2020; U.S. Pat. No. 10,568,808 B2, inventor Ferracamo, Jr., which issued Feb. 25, 2020; U.S. Pat. No. 10,309,709 B2, inventors Emond et al., which issued Jun. 4, 2019; U.S. Pat. No. 9,944,449 B2, inventors Wood et al., which issued Apr. 17, 2018; U.S. Pat. No. 9,689,602 B2, inventors Emond et al., which issued Jun. 27, 2017; U.S. Pat. No. 9,429,350 B2, inventor Chapman, Jr., which issued Aug. 30, 2016; U.S. Pat. No. 9,366,469 B2, inventor Chapman, Jr., which issued Jun. 14, 2016; U.S. Pat. No. 9,180,998 B2, inventors Banks et al., which issued Nov. 10, 2015; U.S. Pat. No. 9,045,278 B2, inventors Mustafa et al., which issued Jun. 2, 2015; U.S. Pat. No. 8,938,986 B2, inventors Matta et al., which issued Jan. 27, 2015; U.S. Pat. No. 8,887,515 B2, inventor Patstone, which issued Nov. 18, 2014; U.S. Pat. No. 8,613,202 B2, inventor Williams, which issued Dec. 24, 2013; U.S. Pat. No. 8,607,581 B2, inventors Williams et al., which issued Dec. 17, 2013; U.S. Pat. No. 8,250,882 B2, inventors Mustafa et al., which issued Aug. 28, 2012; U.S. Pat. No. 8,074,465 B2, inventors Heroux et al., which issued Dec. 13, 2011; U.S. Pat. No. 8,152,367 B2, inventors Roberts et al., which issued Apr. 10, 2012; U.S. Pat. No. 7,849,708 B2, inventor Goncharko et al., which issued Dec. 14, 2010; U.S. Pat. No. 7,257,963 B2, inventor Mayer, which issued Aug. 21, 2007; U.S. Pat. No. 7,028,504 B2, inventor Derifield, which issued Apr. 18, 2006; U.S. Pat. No. 6,875,486 B2, inventor Miller, which issued Apr. 5, 2005; U.S. Pat. No. 6,482,332 B1, inventor Malach, which issued Nov. 19, 2002; U.S. Pat. No. 6,116,042, inventor Purdum, which issued Sep. 12, 2000; U.S. Pat. No. 5,924,302, inventor Derifield, which issued Jul. 20, 1999; U.S. Pat. No. 5,899,088, inventor Purdum, which issued May 4, 1999; U.S. Patent Application Publication No. US 2022/0343270 A1, inventors Melchor et al., which published Oct. 27, 2022; U.S. Patent Application Publication No. US 2022/0333840 A1, inventors Chasteen et al., which published Oct. 20, 2022; U.S. Patent Application Publication No. US 2022/0267081 A1, inventors Conway et al., which published Aug. 25, 2022; U.S. Patent Application Publication No. US 2022/0002070 A1, inventors Moghaddas et al., which published Jan. 6, 2022; U.S. Patent Application Publication No. US 2021/0300665 A1, inventor Melchor, which published Sep. 30, 2021; U.S. Patent Application Publication No. US 2021/0070539 A1, inventors Chasteen et al., which published Mar. 11, 2021; U.S. Patent Application Publication No. 2020/0231362 A1, inventors Kulangara et al., which published Jul. 23, 2020; U.S. Patent Application Publication No. US 2020/0002075, inventors Lee et al., which published Jan. 2, 2020; U.S. Patent Application Publication No. US 2011/0290792 A1, inventors Krzak et al., which published Dec. 1, 2011; and PCT International Publication No. WO 2018/213348 A2, which published Nov. 22, 2018.

SUMMARY OF THE INVENTION

It is an object of the present invention to provide a novel system suitable for storing and/or transporting temperature-sensitive materials.

Therefore, according to one aspect of the invention, there is provided a system suitable for storing and/or transporting temperature-sensitive materials, the system comprising (a) an insulated container, the insulated container comprising a plurality of walls, the plurality of walls being molded together and collectively defining a cavity and a support, the support being constructed to removably receive a product box in the cavity and to orient the product box at an angle offset from the cavity; and (b) a product box for holding temperature-sensitive materials, the product box being removably retained by the support in the cavity of the insulated container.

In a more detailed feature of the invention, the insulated container may comprise a base, and the plurality of walls may comprise a bottom wall of the base and four side walls of the base.

In a more detailed feature of the invention, the base may be made of an insulating foam. In a more detailed feature of the invention, the insulating foam may be an expanded polystyrene foam.

In a more detailed feature of the invention, the support may comprise a platform and a plurality of stanchions, the platform may be elevated relative to the bottom wall of the base, and the stanchions may extend upwardly from the bottom wall of the base.

In a more detailed feature of the invention, the platform may be shaped to include a top surface and at least one side surface, the at least one side surface may include at least one concave recess, and the at least one concave recess may be at least partially positioned under the product box.

In a more detailed feature of the invention, the support may be oriented so that the angle offset from the cavity may be approximately 45 degrees.

In a more detailed feature of the invention, the product box may be shaped to have four corner edges, and each of the plurality of stanchions may be shaped to removably receive a different one of the four corner edges of the product box.

In a more detailed feature of the invention, each of the stanchions may have a top end, and the top ends of the stanchions may be substantially flush with a top surface of the product box.

In a more detailed feature of the invention, the platform may be shaped to include a top surface, and at least one recess may be provided in the top surface of the platform.

In a more detailed feature of the invention, the support and the product box may divide at least a portion of the cavity into four distinct subcavities.

In a more detailed feature of the invention, the system may further comprise a quantity of phase-change material disposed in each of the four distinct subcavities.

In a more detailed feature of the invention, the phase-change material may comprise dry ice pellets.

In a more detailed feature of the invention, the system may further comprise a tray for holding phase-change material, and the tray may be removably received in the cavity.

In a more detailed feature of the invention, the tray may be seated on top of the support. In a more detailed feature of the invention, the tray may comprise a bottom, four sides, and two handles, the two handles may function as top flaps, and the two handles may be mateable with one another.

In a more detailed feature of the invention, the insulated container may further comprise a shelf disposed in the cavity, and the shelf may slope inwardly and downwardly from the plurality of walls.

In a more detailed feature of the invention, the insulated container may further comprise a lid, and the lid may be removably mounted on the base to close the cavity.

In a more detailed feature of the invention, the base may comprise a shelf that may slope inwardly and downwardly from the plurality of walls, the lid may comprise a plug, and the plug may have a bottom surface that mates with the shelf.

In a more detailed feature of the invention, the system may further comprise a data logger, the data logger may comprise a main body and a cord terminating in a probe, and the lid may comprise a top surface having a recess for removably receiving the main body of the data logger.

In a more detailed feature of the invention, the top surface of the lid may further comprise at least one channel perpendicular to the recess for removably receiving the main body of the data logger.

In a more detailed feature of the invention, the top surface of the lid may further comprise a channel for removably receiving the cord.

In a more detailed feature of the invention, the channel for removably receiving the cord may terminate in an opening having curved edges.

In a more detailed feature of the invention, the system may further comprise packaging for returning the data logger, and the top surface of the lid may comprise a recess for storing the packaging prior to its deployment.

In a more detailed feature of the invention, the lid may comprise at least one recess dimensioned to serve as a handle.

In a more detailed feature of the invention, each of the lid and the base may have a single chamfered corner, and the chamfered corners of the lid and the base may mate with one another.

In a more detailed feature of the invention, the lid may have at least one corner that may overhang a corresponding corner of the base.

In a more detailed feature of the invention, the base may be shaped to include a channel that may extend downwardly from a top surface of the base and inwardly from an exterior surface of the base into the cavity, and the channel may be dimensioned for receiving a data logger cord.

In a more detailed feature of the invention, the product box may comprise a pocket for receiving a temperature probe of a data logger.

In a more detailed feature of the invention, the base may be shaped to include a channel that may extend downwardly from a top surface of the base and inwardly from an exterior surface of the base into the cavity, the channel may be dimensioned for receiving a data logger cord, and the pocket of the product box may be aligned with the channel.

In a more detailed feature of the invention, the system may further comprise an outer box, and the insulated container may be removably received within the outer box.

In a more detailed feature of the invention, the outer box may comprise at least one handle, and the insulated container may be shaped to include at least one recess for accommodating the at least one handle.

According to another aspect of the invention, there is provided a system suitable for storing and/or transporting temperature-sensitive materials, the system comprising (a) an insulated container, the insulated container comprising a plurality of walls, the plurality of walls collectively defining a cavity for receiving a temperature-sensitive material; (b) a product box, the product box being removably mounted within the cavity of the insulated container, the product box including a space for receiving a temperature-sensitive material and a pocket for receiving a temperature probe of a data logger; and (c) a data logger, the data logger comprising a main body and a cord, the cord terminating in a probe, the probe being inserted into the pocket of the product box.

In a more detailed feature of the invention, the product box may further comprise one or more dividers for dividing the cavity into a plurality of subcavities.

In a more detailed feature of the invention, the product box may further comprise one or more flaps for engaging the insulated container to prevent rotation of the product box relative to the cavity.

The present invention is also directed at methods of making and using the aforementioned system.

For purposes of the present specification and claims, various relational terms like "top," "bottom," "proximal," "distal," "upper," "lower," "front," and "rear" may be used to describe the present invention when said invention is positioned in or viewed from a given orientation. It is to be understood that, by altering the orientation of the invention, certain relational terms may need to be adjusted accordingly.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions or may be shown in a simplified form for purposes of explication. In the drawings wherein like reference numerals represent like parts.

DETAILED DESCRIPTION OF THE INVENTION

Figure 1:
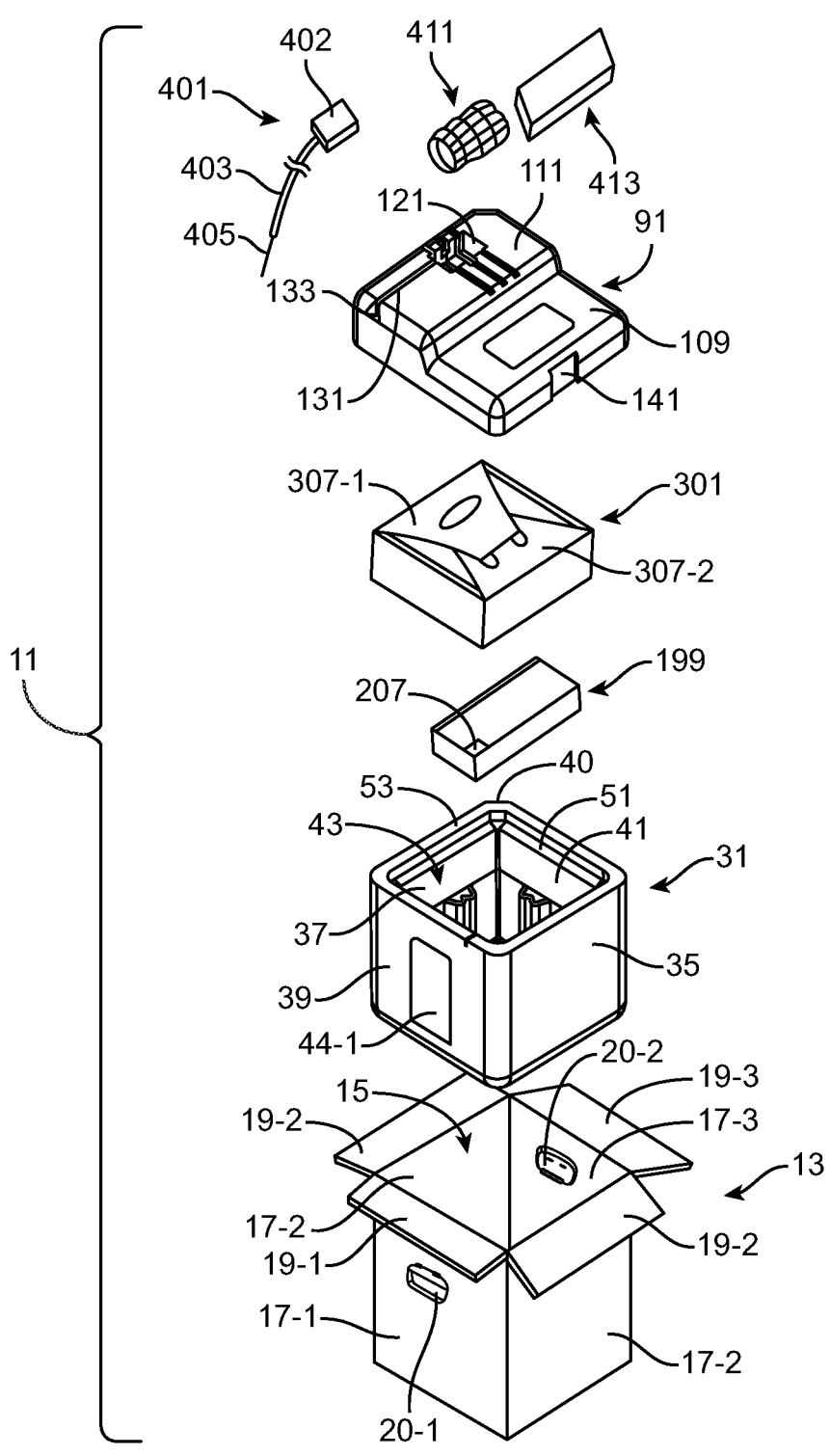
FIG. 1 is a partly exploded perspective view of a first embodiment of a system constructed according to the present invention, the system being suitable for storing and/or transporting temperature-sensitive materials.

Referring now to FIG. 1, there is shown a partly exploded perspective view of a first embodiment of a system suitable for storing and/or transporting temperature-sensitive materials, the system being constructed according to the present invention and being represented generally by reference numeral 11. Details of system 11 that are discussed elsewhere in this application or that are not critical to an understanding of the invention may be omitted from FIG. 1 and/or from the accompanying description herein or may be shown in FIG. 1 and/or described herein in a simplified manner.

System 11 may be used to maintain a payload within a desired temperature range for an extended period of time, such as several hours up to a few days or longer. In the present embodiment, system 11 may be configured to maintain a parcel-sized payload within a temperature range of about −90° C. to −60° C. for an extended period of time; however, it is to be understood that system 11 need not be limited to parcel-sized payloads and/or that system 11 need not be limited to a temperature range of about −90° C. to −60° C.

System 11 may comprise an outer box 13. Outer box 13, which may be, for example, a conventional corrugated cardboard box or carton, may comprise a rectangular prismatic cavity 15 bounded by a plurality of rectangular side walls 17-1 through 17-4, a plurality of bottom closure flaps (none of which is shown), and a plurality of top closure flaps 19-1 through 19-4. Adhesive strips of tape or other closure means (not shown) may be used to retain, in a closed condition, the bottom closure flaps and/or top closure flaps 19-1 through 19-4.

Figures 2A, 2B:
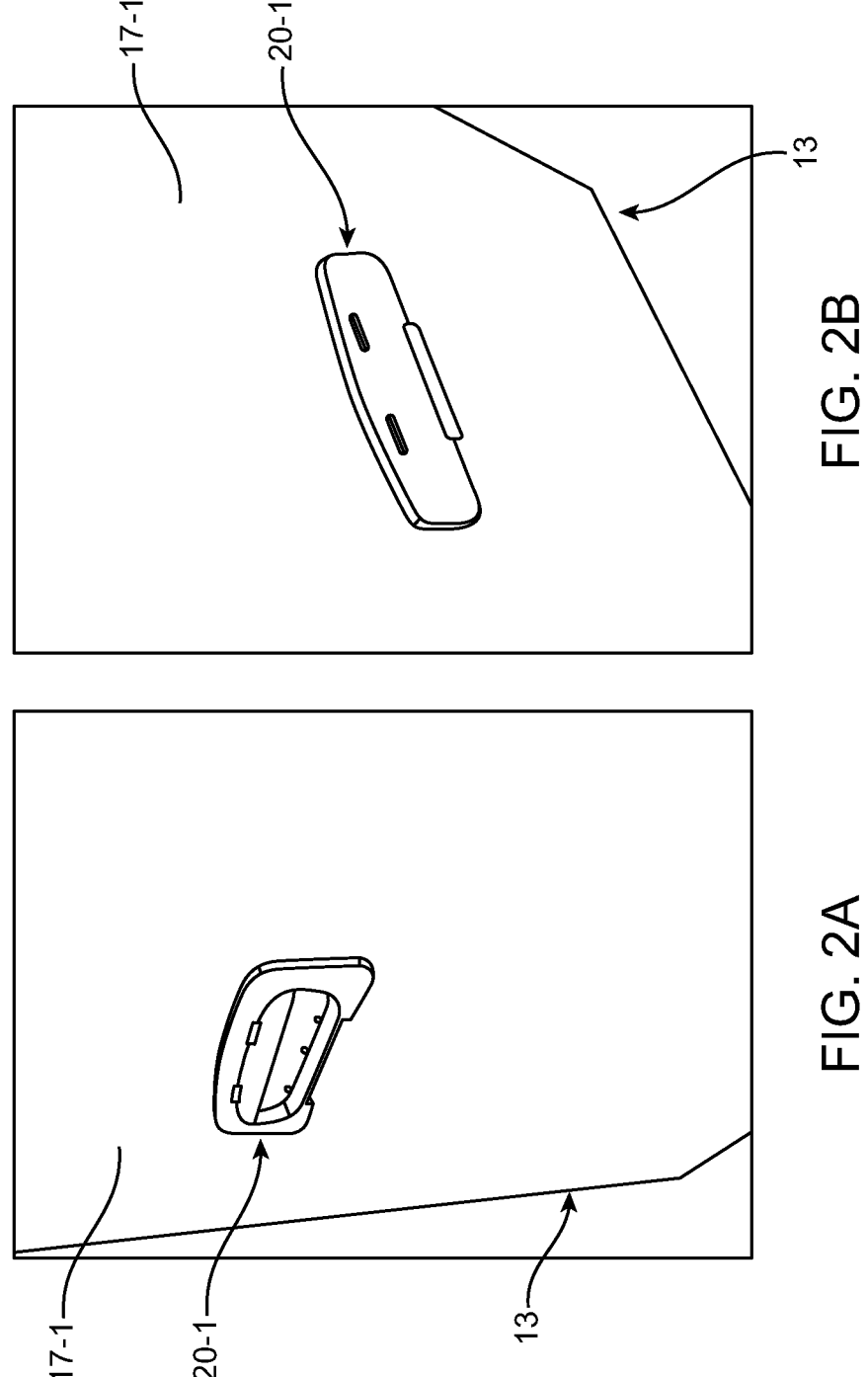
FIGS. 2A and 2B are enlarged fragmentary perspective views of the exterior and interior, respectively, of the outer box shown in FIG. 1.
Figure 3B:
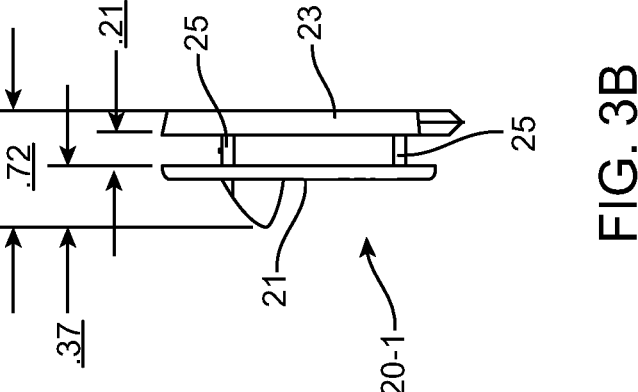
FIGS. 3A and 3B are front and side views, respectively, of the handle shown in FIG. 2A, the handle being shown in an unassembled state in FIG. 3A and in an assembled state in FIG. 3B.
Figure 3A:
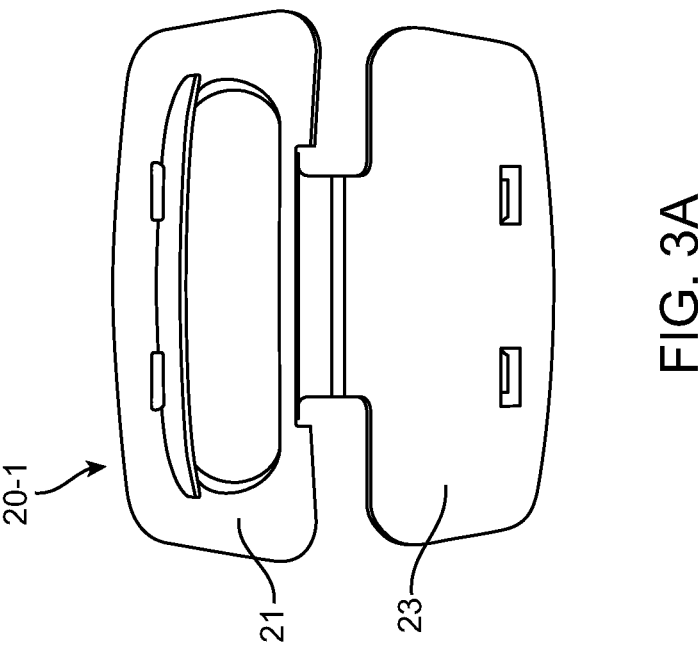
Figure 4A:
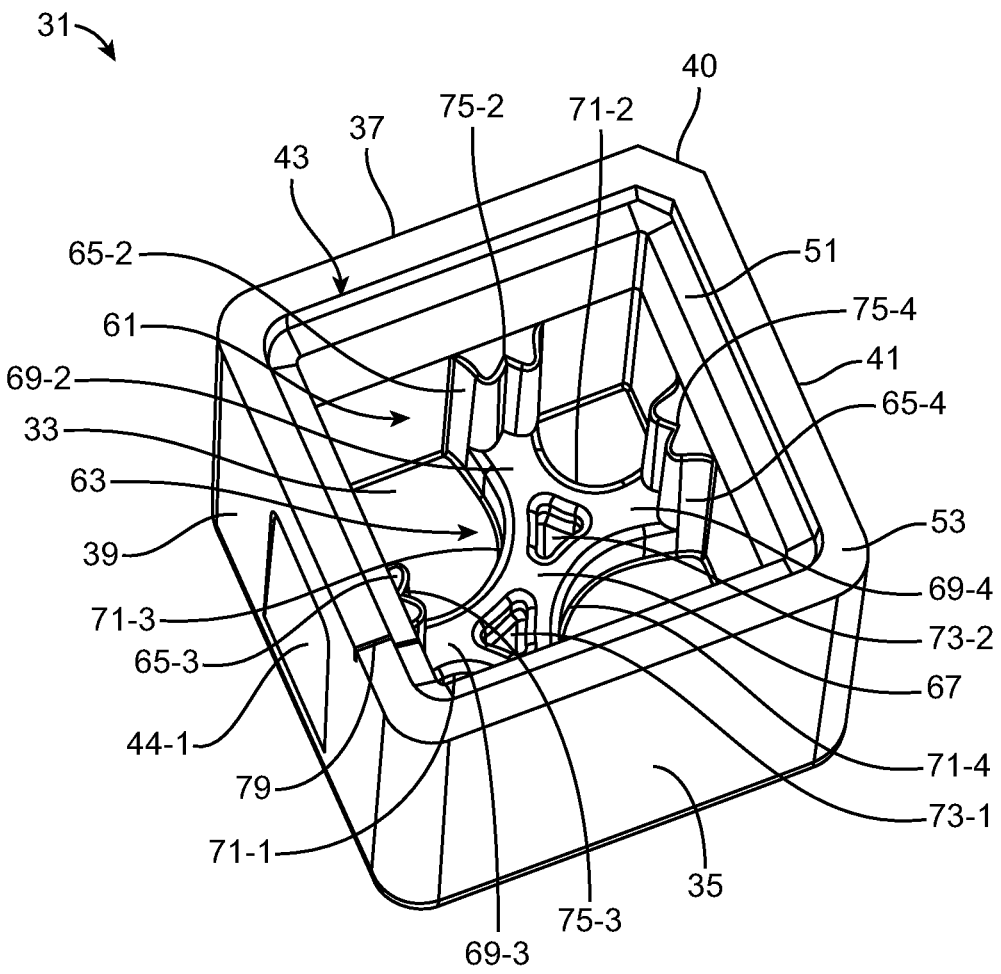
FIG. 4A is an enlarged top front perspective view of the base shown in FIG. 1.
Figure 4B:
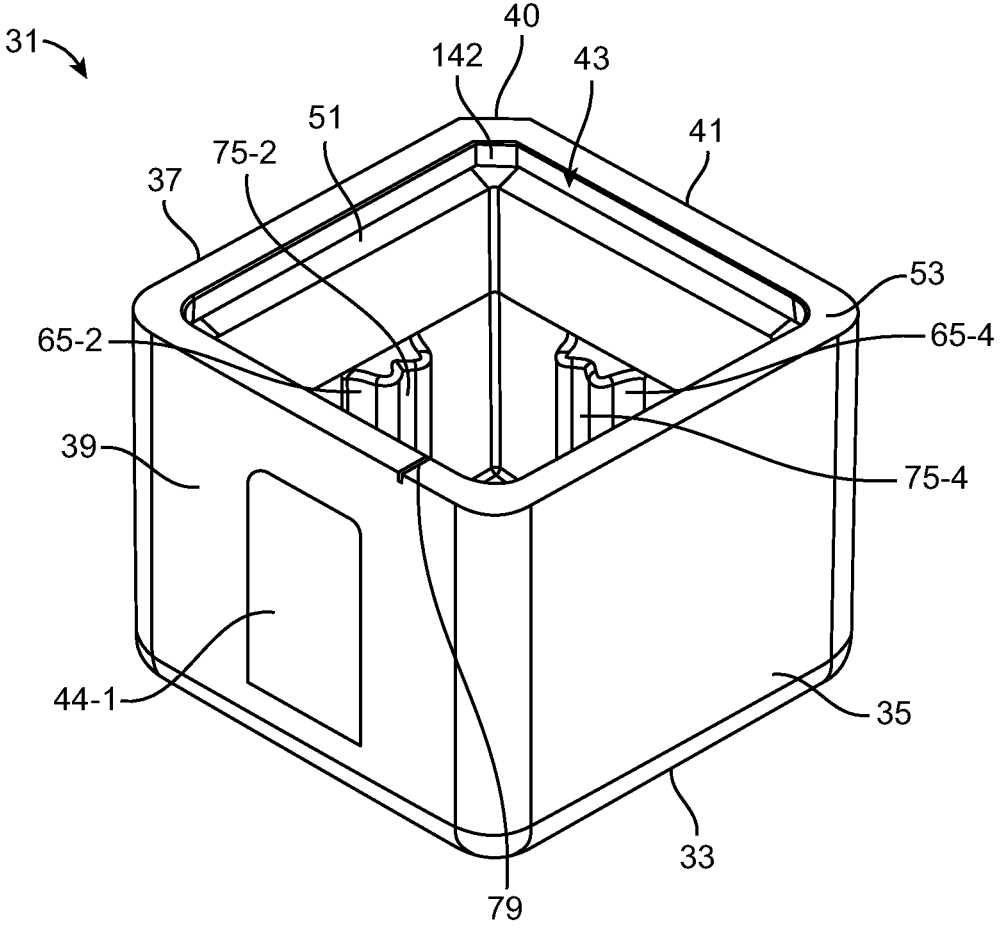
FIG. 4B is a top perspective view, from the front left corner, of the base shown in FIG. 4A.
Figure 4C:
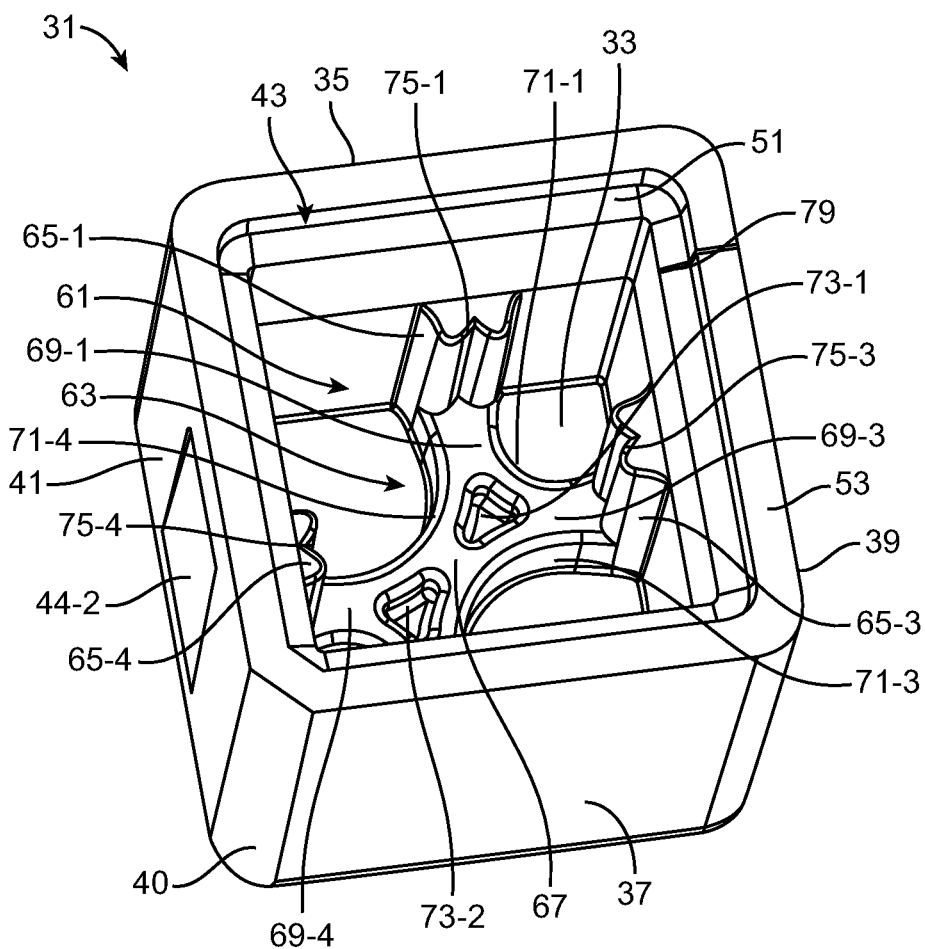
FIG. 4C is a top rear perspective view of the base shown in FIG. 4A.
Figure 4D:
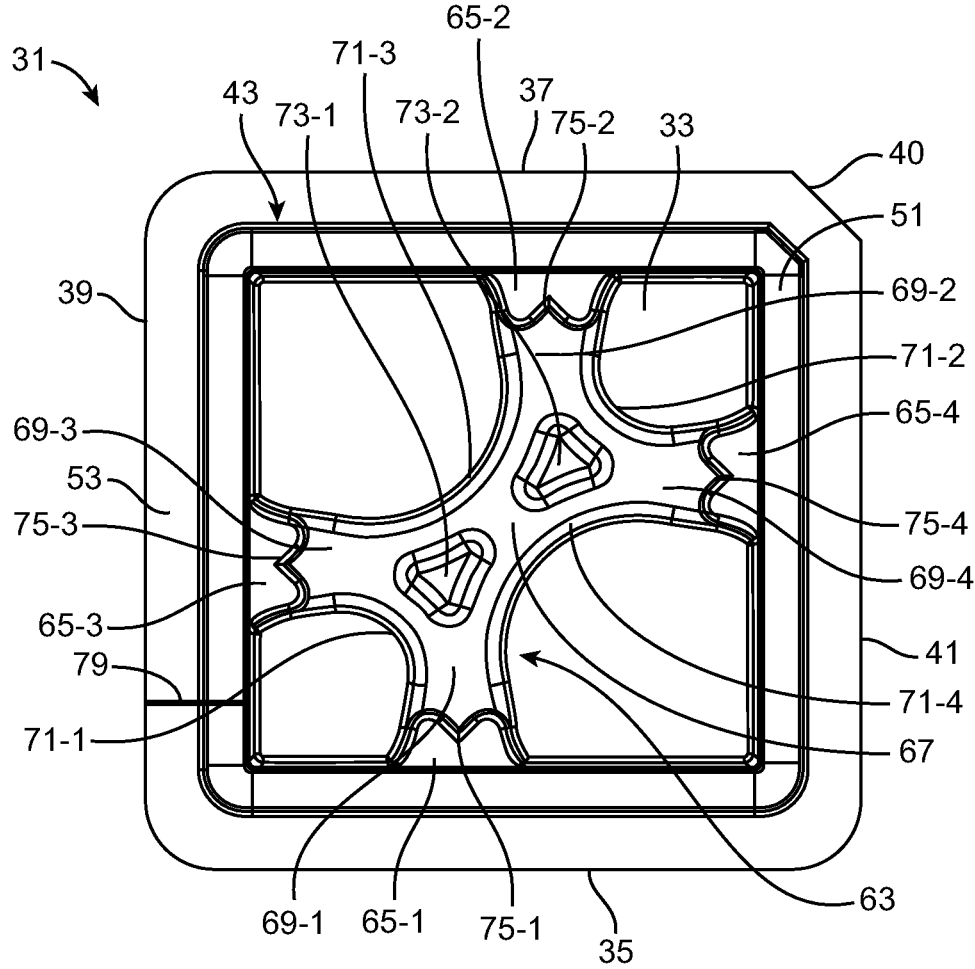
FIG. 4D is a top view of the base shown in FIG. 4A.
Figure 4E:
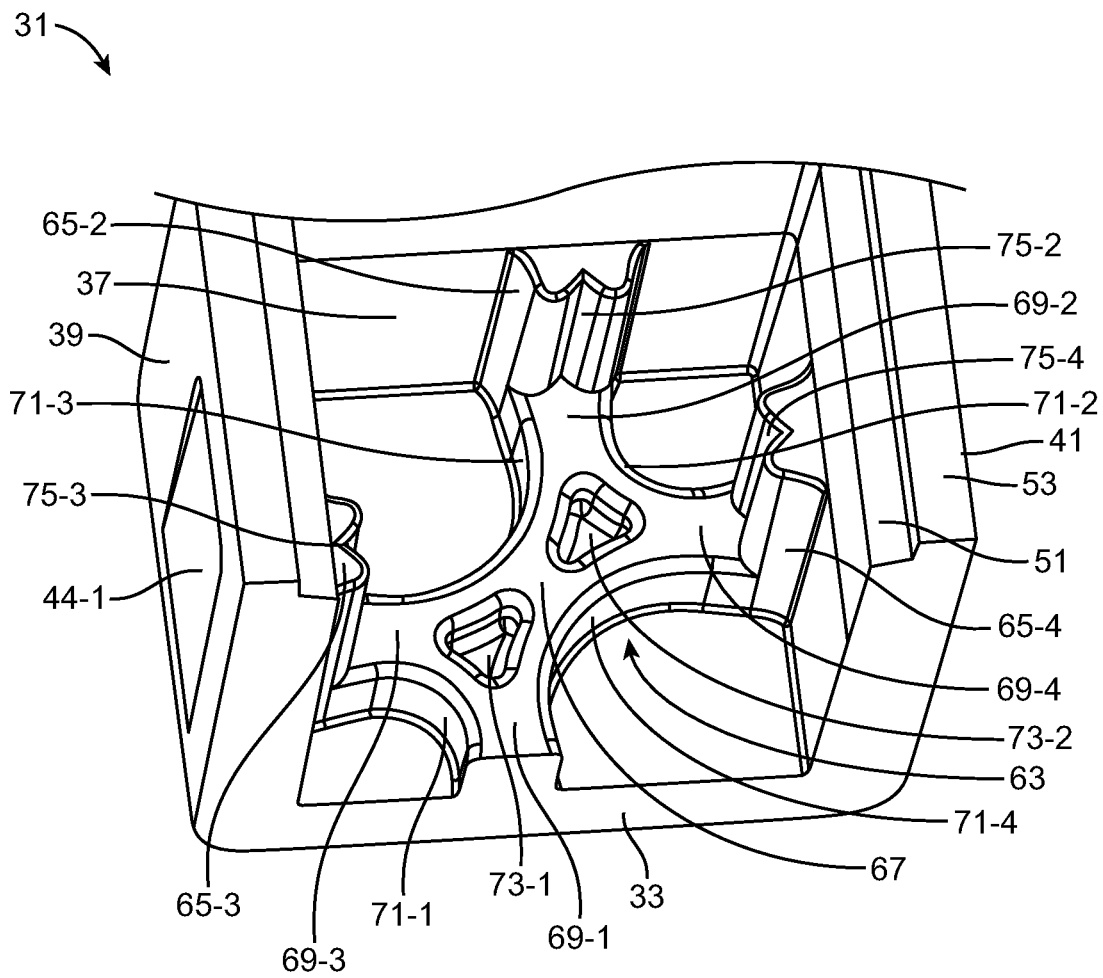
FIG. 4E is a fragmentary section view of the base shown in FIG. 4A.
Figure 5A:
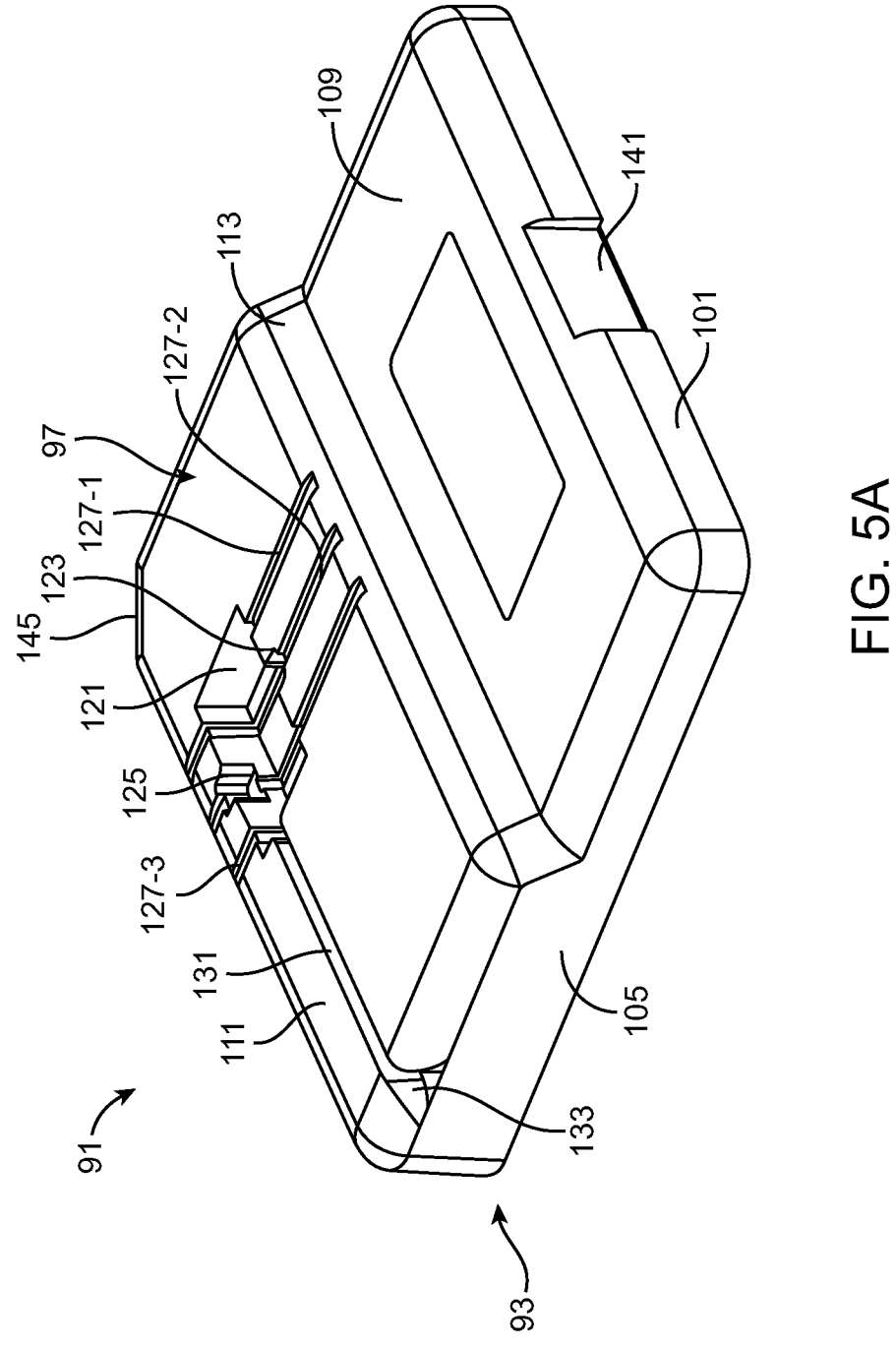
FIG. 5A is an enlarged top perspective view of the lid shown in FIG. 1.
Figure 5B:
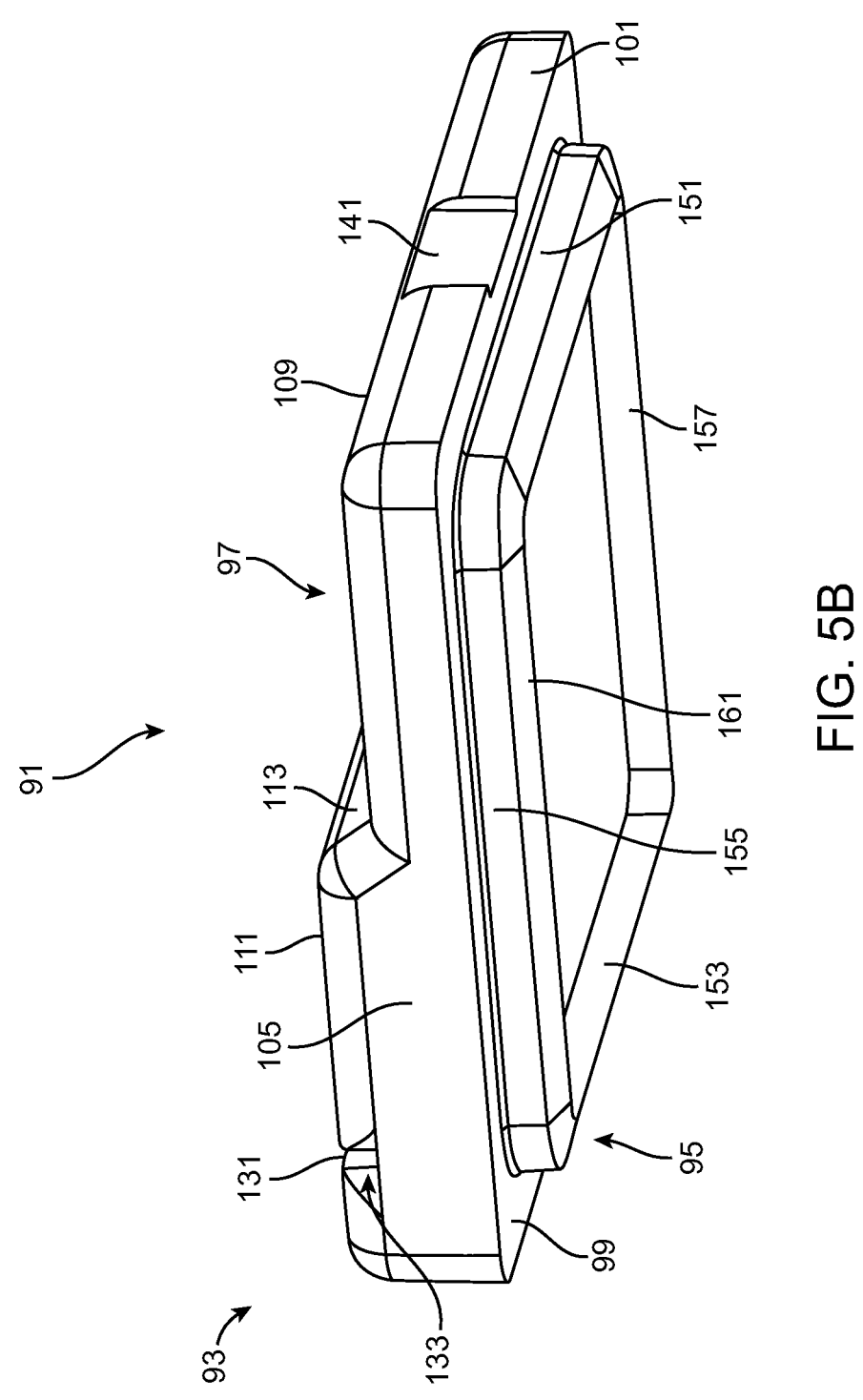
FIG. 5B is an enlarged bottom perspective view of the lid shown in FIG. 5A.
Figure 5C:
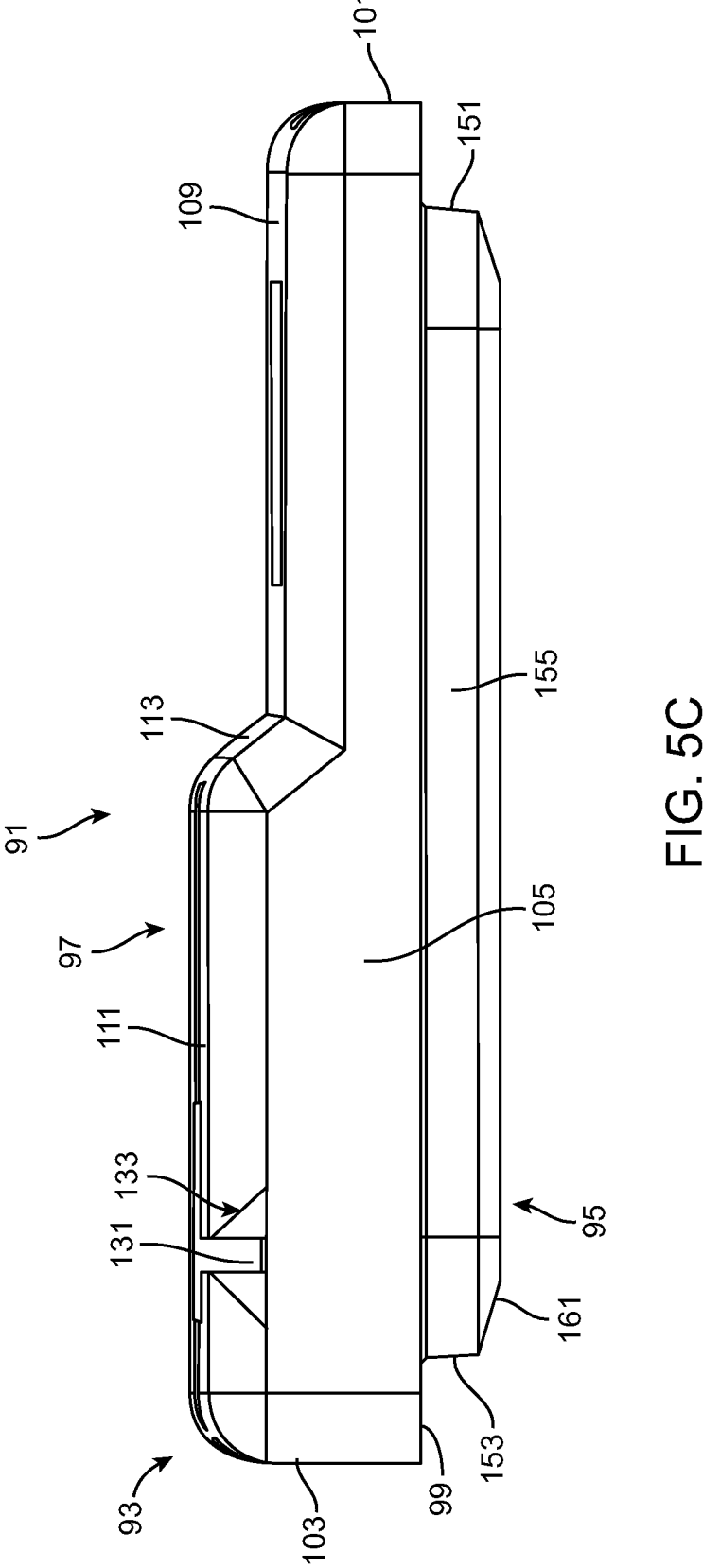
FIG. 5C is a left side view of the lid shown in FIG. 5A.
Figure 5D:
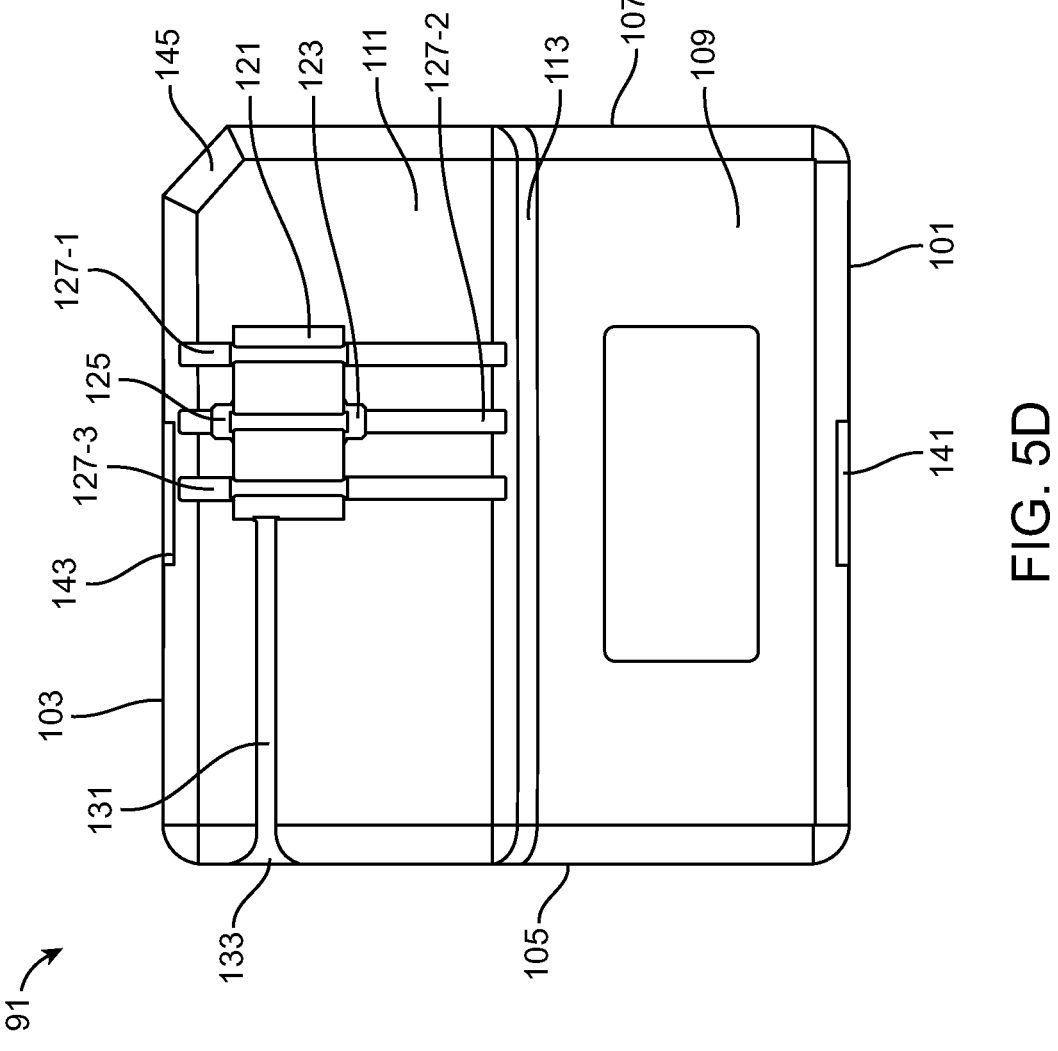
FIG. 5D is a top view of the lid shown in FIG. 5A.
Figure 5E:
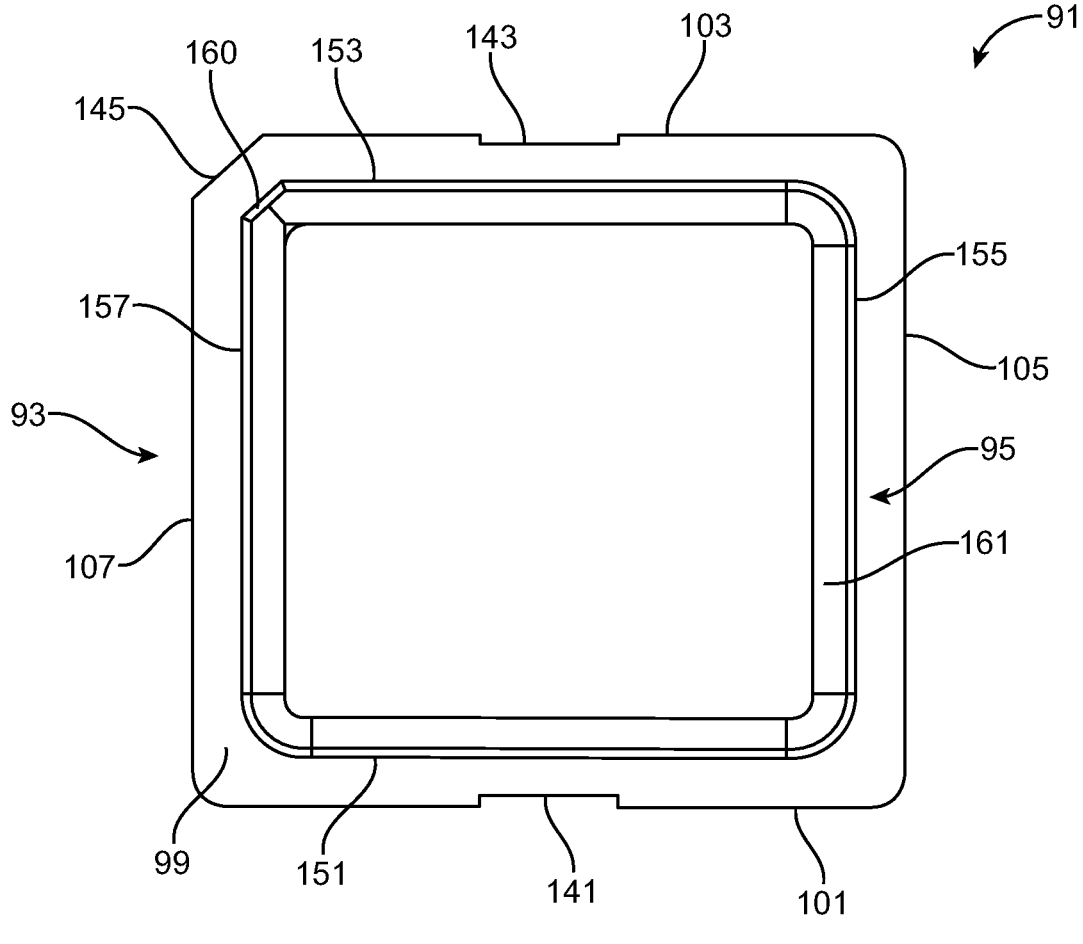
FIG. 5E is a bottom view of the lid shown in FIG. 5A.
Figure 6A:
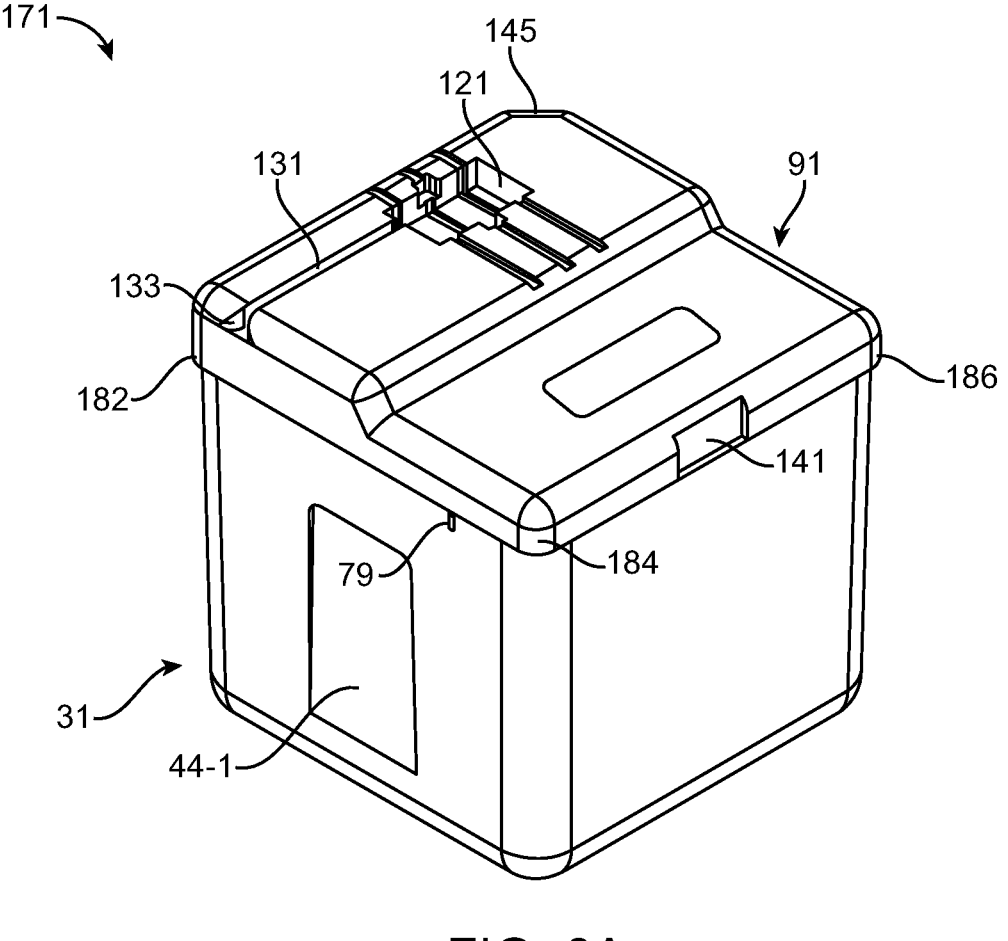
FIG. 6A is an enlarged front top perspective view, showing the base and the lid of FIG. 1 assembled to form a cooler.
Figure 6B:
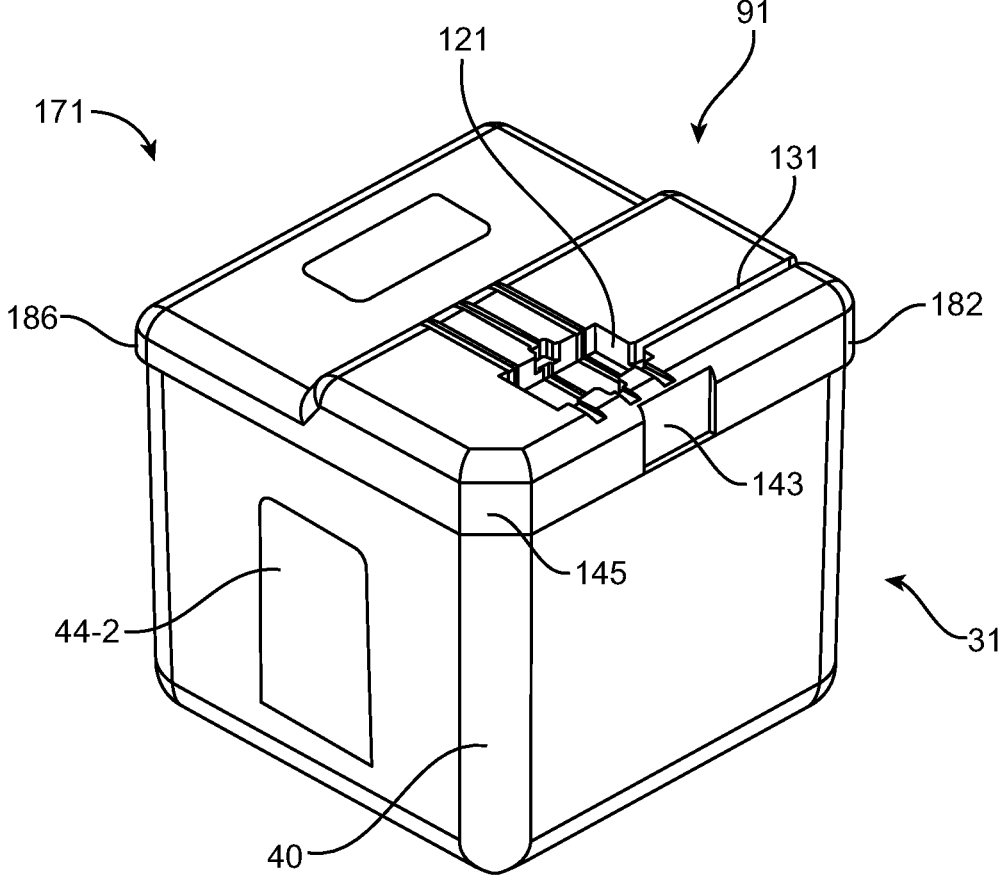
FIG. 6B is a front rear perspective view, showing the cooler of FIG. 6A.
Figure 6C:
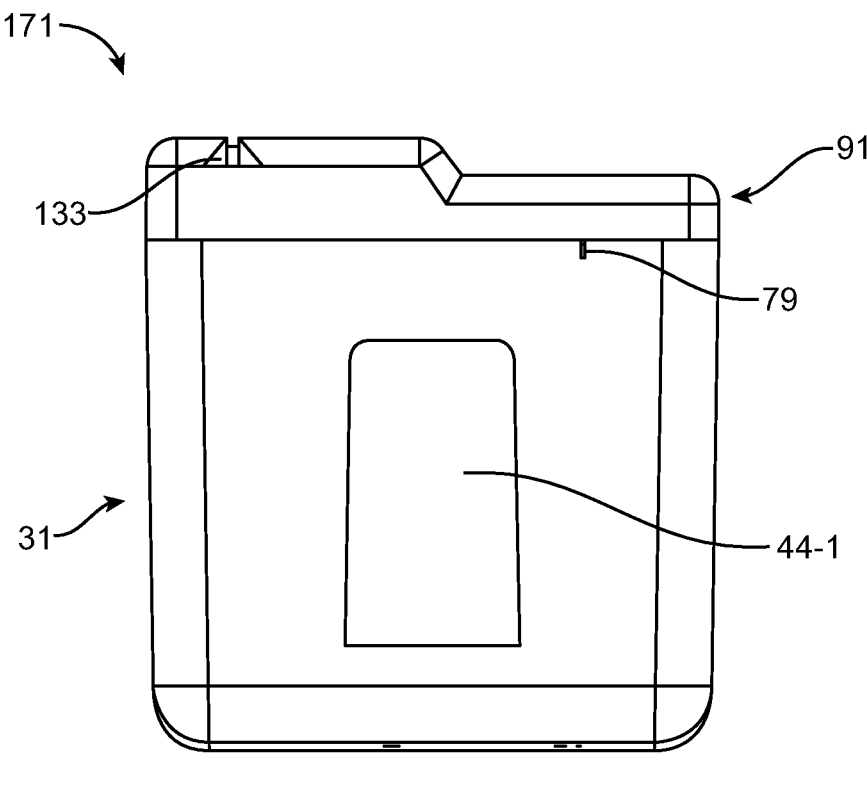
FIG. 6C is a left side view, showing the cooler of FIG. 6A.
Figure 6D:
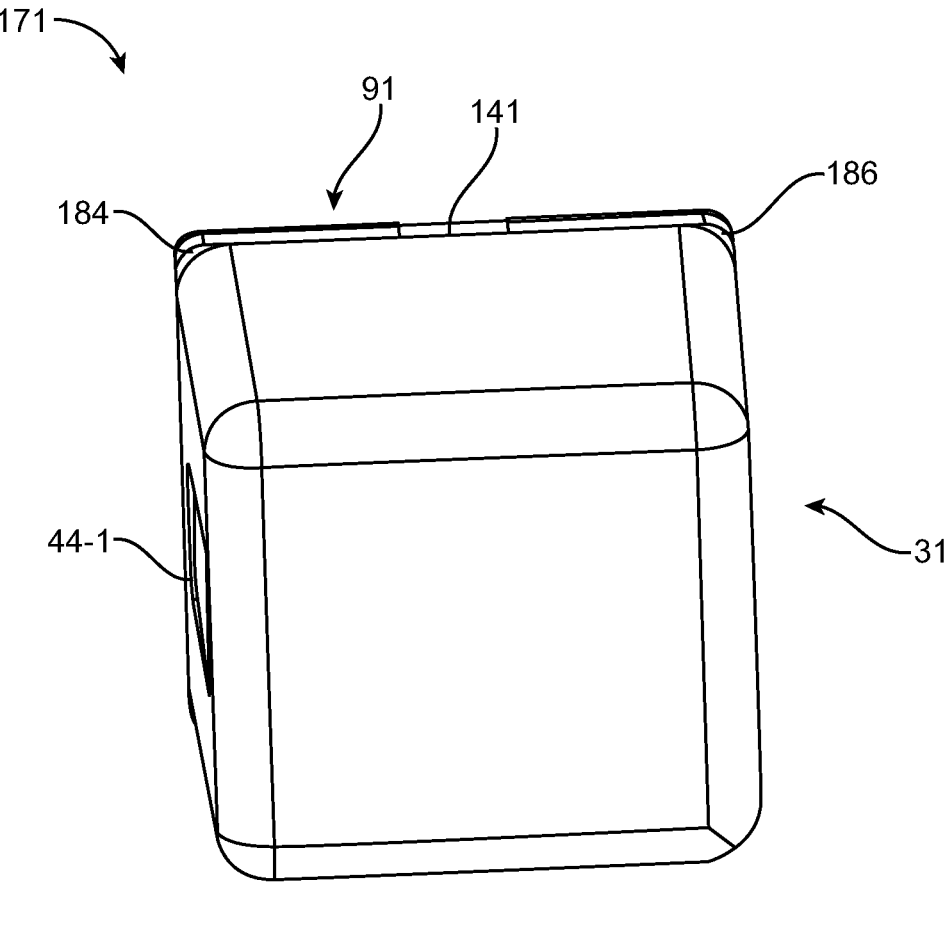
FIG. 6D is a bottom perspective view, showing the cooler of FIG. 6A.
Figure 6E:
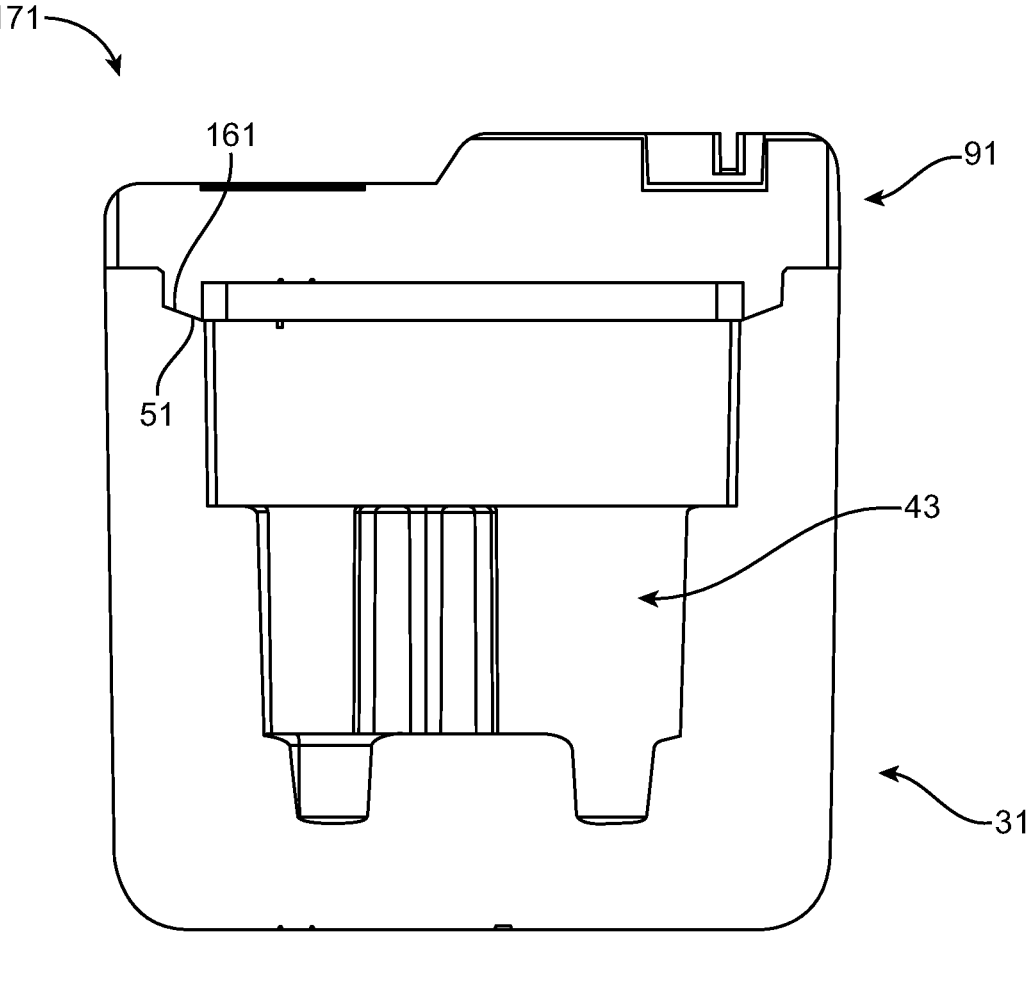
FIG. 6E is a longitudinal section view of the cooler of FIG. 6A.

Side wall 17-1 may be equipped with a handle 20-1, and side wall 17-3 may be equipped with a handle 20-2. Handles 20-1 and 20-2, which may be identical to one another in size, shape and construction, may be used to facilitate the carrying or other movement of outer box 13, as well as any items disposed in cavity 15. Handle 20-1 is shown in FIGS. 2A and 2B mounted on side wall 17-1 and is also shown separately in FIGS. 3A and 3B. As can be seen, handle 20-1 may include a first portion 21, which may be positioned along the exterior of side wall 17-1, and a second portion 23, which may be positioned along the interior of side wall 17-1. First portion 21 and second portion 23 may be connected to one another by one or more connecting portions 25, which may be inserted through one or more openings in side wall 17-1. Some exemplary dimensions (in inches) for handle 20-1 are shown in FIG. 3B.

It should be understood that, although, in the present embodiment, handles 20-1 and 20-2 are shown as separate structures from outer box 13, outer box 13 could alternatively be constructed to include one or more integrally formed handles.

Referring back to FIG. 1, system 11 may further comprise a base 31, which is also shown separately in FIGS. 4A through 4E. Details of base 31 that are discussed elsewhere in this application or that are not critical to an understanding of the invention may be omitted from one or more of FIGS. 1 and 4A through 4E and/or from the accompanying description herein or may be shown in one or more of FIGS. 1 and 4A through 4E and/or described herein in a simplified manner.

Base 31 may consist of or comprise a thermally-insulating material. Preferably, base 31 is a unitary (i.e., one-piece) structure made of a thermally-insulating material. For example, in the present embodiment, base 31 may consist of or comprise a molded expanded polystyrene (EPS) foam or similar material. Base 31 may be a generally rectangular hollow structure that is dimensioned to fit snugly, yet removably, within a lower portion of cavity 15 of outer box 13. More specifically, base 31 may be shaped to include a bottom wall 33, a front wall 35, a rear wall 37, a left wall 39, a right wall 41, and an open top. Bottom wall 33, front wall 35, rear wall 37, left wall 39, and right wall 41 may collectively define a cavity 43 that is generally rectangular prismatic in shape and open at its top end. Base 31 may exhibit a small draft angle (i.e., front wall 35, rear wall 37, left wall 39, and right wall 41 may taper inwardly slightly from top to bottom), for example, where base 31 is made by injection molding. Front wall 35, rear wall 37, left wall 39, and right wall 39 may be similar to one another in outer dimensions such that base 31 may have a generally square profile when viewed from above.

The exterior surfaces of front wall 35, rear wall 37, left wall 39 and right wall 41 may be rounded where they meet the exterior surface of bottom wall 33 and vice versa. In addition, the exterior surface of front wall 35 may be rounded where it meets the exterior surface of each of left wall 39 and right wall 41 and vice versa. Moreover, the exterior surface of rear wall 37 may be rounded where it meets the exterior surface of left wall 39 and vice versa. By contrast, the exterior surface of base 31, as well as a top section of the interior surface of base 31, may comprise a chamfered corner 40 where rear wall 37 and right wall 41 meet. As will be discussed further below, chamfered corner 40 may be used to facilitate the proper orientation of a lid on base 31.

A recess 44-1 may be provided along the exterior of left wall 39, and a recess 44-2 may be provided along the exterior of right wall 41. Recesses 44-1 and 44-2, which may be identical to one another in size and shape, may be in the form of angled cut-outs that are appropriately dimensioned to receive the interiorly-facing portions of handles 20-1 and 20-2, respectively, thereby allowing the exterior vertical surfaces of base 31 to be positioned against the corresponding interior vertical surfaces of outer box 13. In this manner, a snug fit may be achieved between base 31 and outer box 13, without interference caused by handles 20-1 and 20-2 and without a gap existing between base 31 and outer box 13.

The interior surfaces of front wall 35, rear wall 37, left wall 39, and right wall 41 may be shaped to collectively form a shelf 51 that extends along the inner periphery of base 31 at a short distance below a top edge 53 of base 31. Shelf 51 may be angled slightly downwardly moving inwardly from its periphery. In cases where base 31 is used to receive dry ice pellets (or the like) and such dry ice pellets are poured into cavity 43 of base 31 from its open top end, the aforementioned downward slope of shelf 51 may be helpful in guiding the dry ice pellets into a lower part of cavity 43, where they are desired, as opposed to having such pellets stay in place on shelf 51, where they may interfere with the closure of base 31 using a lid.

Additionally, the interior surfaces of front wall 35, rear wall 37, left wall 39, and right wall 41 may further be shaped to collectively form a support 61 that may be disposed in a lower part of cavity 43 that is spaced below shelf 51. Support 61 may comprise a platform 63 and four stanchions 65-1 through 65-4. As will be discussed further below, support 61 may be used to receive a product box, which may be seated directly on top of platform 63 and which may be held in place by stanchions 65-1 through 65-4. In addition, support 61 may also be used to support a tray for holding phase-change material, such as dry ice pellets, which tray may be placed directly on top of stanchions 65-1 through 65-4.

Platform 63, which may be used to elevate a product box from the interior surface of bottom wall 33, may extend upwardly from bottom wall 33 for a short distance. Platform 63 may be generally rectangular in shape and may include a central portion 67 and a plurality of extensions 69-1 through 69-4 extending from the four corners of central portion 67. Central portion 67 and extensions 69-1 through 69-4 may be shaped to collectively define a plurality of arches or concave recesses 71-1 through 71-4 provided along the four sides of platform 63. Concave recesses 71-1 through 71-4 may serve to permit dry ice pellets or the like to be positioned below a product box that may be seated on platform 63. In this manner, as will become apparent below, dry ice pellets or the like not only may be positioned around the four sides of a product box seated on platform 63 but also, to some extent, below such a product box.

A pair of cavities 73-1 and 73-2 may be provided in central portion 67. Cavities 73-1 and 73-2, which may extend downwardly from a top surface of central portion 67 for a portion of the height of platform 63, may provide a thermal break between the top of platform 63 and the exterior surface of bottom wall 33. In other words, instead of having a continuous solid platform 63 with a large thickness between the top of platform 63 and the exterior surface of bottom wall 33, cavities 73-1 and 73-2 break the path of thermal resistance while maintaining a sufficient amount of insulation below the product box.

As noted above, extensions 69-1 through 69-4 may extend away from the four corners of central portion 67, with the distal ends of extensions 69-1 through 69-4 merging with stanchions 65-1 through 65-4, respectively.

Stanchion 65-1 may extend upwardly from bottom wall 33 along front wall 35, stanchion 65-2 may extend upwardly from bottom wall 33 along rear wall 37, stanchion 65-3 may extend upwardly from bottom wall 33 along left wall 39, and stanchion 65-4 may extend upwardly from bottom wall along right wall 41. Preferably, stanchions 65-1 through 65-4 extend upwardly from bottom wall 33 for only a portion of the height of base 31, with the top ends of stanchions 65-1 through 65-4 being positioned a distance below shelf 51. In this manner, as will be discussed further below, a tray, which may be used to hold dry ice pellets or the like, may be positioned on top of stanchions 65-1 through 65-4 without extending upwardly much, if at all, beyond shelf 51.

Also, as noted above, stanchions 65-1 through 65-4 may additionally be used to retain a product box in a particular orientation within cavity 43 of base 31. To this end, stanchions 65-1 through 65-4 may be shaped to include slots 75-1 through 75-4, respectively, wherein each of slots 75-1 through 75-4 may be used to receive a different corner of the product box. In the present embodiment, the provision of slots 75-1 through 75-4 in stanchions 65-1 through 65-4 may be achieved by providing stanchions 65-1 through 65-4 with an M-shaped profile as viewed from above; however, it is to be understood that other profiles can alternatively be used to achieve a similar result. Also, it is to be understood that, although, in the present embodiment, stanchions 65-1 through 65-4 and slots 75-1 through 75-4 are appropriately dimensioned to substantially match the height of the product box so that the product box may be seated directly on platform 63 and so that a tray may be positioned directly above and in contact with, or proximate to, the product box, this need not be the case.

Additionally, stanchions 65-1 through 65-4 may be positioned at points along front wall 35, rear wall 37, left wall 39, and right wall 41, respectively, such that platform 63 may be oriented at a desired angle relative to cavity 43 of base 31. For example, in the present embodiment, stanchions 65-1 through 65-4 may be positioned so that platform 63 may be oriented at an offset angle of approximately 45 degrees relative to cavity 43 of base 31. Alternatively, stanchions 65-1 through 65-4 may be appropriately positioned so that platform 63 may be oriented at an offset angle that is other than a 45 degree angle relative to cavity 43 of base 31. In fact, depending on the dimensions of the product box, stanchions 65-1 through 65-4 may be positioned appropriately to achieve any desired orientation, whether offset or otherwise, of the product box relative to cavity 43 of base 31.

Figure 13:
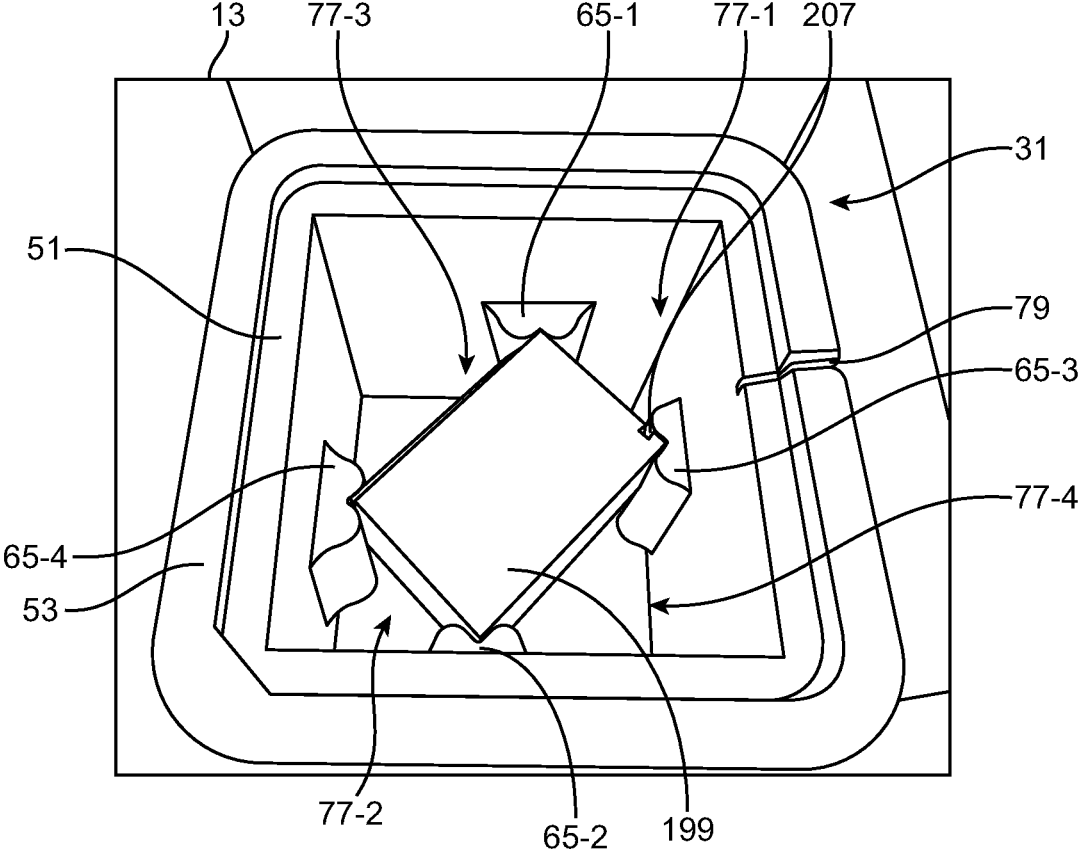
FIG. 13 is a fragmentary top perspective view, showing the base of FIG. 1 disposed within the outer box of FIG. 1, with the product box of FIG. 1 disposed within the base.

In the present embodiment, because of the orientation of platform 63, when a product box is received within support 61, the lower part of cavity 43 (i.e., the portion of cavity 43 extending from the interior surface of bottom wall 33 up to the tops of stanchions 65-1 through 65-4) may be regarded as being divided into four distinct subcavities (see FIG. 13). Two of these subcavities, namely, a subcavity 77-1 defined, in part, by stanchions 65-1 and 65-3 and a subcavity 77-2 defined, in part, by stanchions 65-2 and 65-4, may be of a comparatively smaller volume (while being of substantially identical volume to one another) whereas two of these subcavities, namely, a subcavity 77-3 defined, in part, by stanchions 65-1 and 65-4 and a subcavity 77-4 defined, in part, by stanchions 65-2 and 65-3, may be of a comparatively greater volume (while being of substantially identical volume to one another).

In addition, in view of the above, cavity 43 of base 31 may be regarded as including three sections, namely, a top section that is bounded at its top by top edge 53 and at its bottom by shelf 51, a bottom section that is bounded at its bottom by the interior surface of bottom wall 33 and at its top by the tops of stanchions 65-1 through 65-4, and an intermediate section that is disposed between the aforementioned top and bottom sections. It may be noted that whereas, in some figures of the present application, the aforementioned intermediate and bottom sections may be shown separated by a seam, such a seam is not necessary.

Referring back now to FIGS. 4A through 4D, base 31 may be further shaped to include a channel 79. Channel 79, which may be used to allow a data logger probe cord to be inserted into cavity 43 of base 31 through a side wall of base 31, may be in the form of a narrow slot provided in left wall 39. In the present embodiment, channel 79 may extend downwardly in left wall 39 from top edge 53 into shelf 51 and may be appropriately dimensioned to snugly, yet removably, receive a data logger probe cord. Channel 79 may be advantageous not only in enabling a data logger probe cord to enter cavity 43 of base 31 without adversely affecting the fitting of a lid onto base 31 but also in keeping the data logger probe cord substantially stationary and guiding the data logger probe cord to a desired position in a product box disposed within cavity 43.

Some exemplary dimensions of base 31 may include the following: outer dimensions of base 31 may be 15.38"× 15.38"; inner dimensions of base 31 may be 10.75"×10.75"; height of base 31 may be 13.27"; height of each of stanchions 65-1 through 65-4 may be 6.38"; wall thickness of base 31 for intermediate section of cavity 43 (i.e., above stanchions 65-1 through 65-4) may be 2.08"; wall thickness of base 31 for bottom section of cavity 43 may be 2.25"; area inside support 61 for holding the product box may be 7.88"×5.13"×4.56"; height of platform 63 may be 1.81"; depth of each of recesses 73-1 and 73-2 may be 1"; combined thickness of platform 63 (in areas excluding recesses 73-1 and 73-2) and bottom wall 33 may be 2.94"; and diameter of slot 79 may be 0.1".

Referring back now to FIG. 1, system 11 may further comprise a lid 91, which is also shown separately in FIGS. 5A through 5E. Details of lid 91 that are discussed elsewhere in this application or that are not critical to an understanding of the invention may be omitted from one or more of FIGS. 1 and 5A through 5E and/or from the accompanying description herein or may be shown in one or more of FIGS. 1 and 5A through 5E and/or described herein in a simplified manner.

Lid 91 may consist of or comprise a thermally-insulating material. Preferably, lid 91 is a unitary (i.e., one-piece) structure made of a thermally-insulating material. For example, in the present embodiment, lid 91 may consist of or comprise a molded expanded polystyrene (EPS) foam or similar material. Lid 91 may comprise an upper portion 93 and a lower portion 95. Upper portion 93 of lid 91 may comprise a generally rectangular solid structure shaped to include a top 97, a bottom 99, a front 101, a rear 103, a left 105, and a right 107. Top 97, in turn, may comprise a front portion 109 and a rear portion 111, wherein front portion 109 and rear portion 111 may be interconnected by an intermediate portion 113. Front portion 109 may be recessed relative to rear portion 111, for example, by approximately 1 inch. In this manner, as will be discussed further below, packaging materials that may be used to ship a data logger of system 11, after system 11 has been used, may be positioned on top of front portion 109, with the top of such packaging materials being substantially flush with the top of rear portion 111.

Rear portion 111 may be shaped to include a recess 121. Recess 121, which may be generally rectangular in shape, may be appropriately dimensioned to snugly, yet removably, receive a data logger, with the top surface of the data logger preferably lying substantially flush with the top surface of rear portion 111. To this end, for example, recess 121 may have dimensions of 3.94"×2.38"×1". In addition, rear portion 111 may also be shaped to include a pair of recesses 123 and 125 that may be in communication with recess 121. Recess 123 may be positioned along a front side of recess 121, and recess 125 may be positioned along a rear side of recess 121. Recesses 123 and 125 may be appropriately dimensioned to function as finger-sized cut-outs that may assist an operator in removing a data logger from recess 121. Additionally, rear portion 111 may further be shaped to include a plurality of channels 127-1 through 127-3 that may run perpendicular to, and through, recess 121. Channels 127-1 through 127-3 may serve to provide an air gap that allows for air flow around a data logger in recess 121 so as to prevent the data logger from reaching extremely low temperatures. This may be advantageous since a data logger may lose functionality if it reaches temperatures of −20° C. or below.

Rear portion 111 may further be shaped to include a channel 131. Channel 131, which may be used to receive a data logger cord, may extend from a left end of recess 121 and may terminate at an end 133 that is flush with left 105. End 133 may be outwardly flared or curved. This may be advantageous in guiding a data logger cord along the left side of lid 91 and, as will be discussed further below, towards channel 79 in base 31 so that a probe at the end of the cord can be placed in a product box inside base 31. By contrast, if end 133 has sharp edges and is not outwardly flared or curved, a data logger cord may become damaged by the pressure of the data logger cord against such sharp edges when the data logger cord is guided to channel 79 in base 31.

A recess 141 may be provided at an approximate midpoint along the length of front 101, and a recess 143 may be provided at an approximate midpoint along the length of rear 103. Recesses 141 and 143 may be appropriately dimensioned to serve as handles to assist an operator in removing lid 91 from base 31.

The exterior surfaces of front 101, a rear 103, left 105, and right 107 may be rounded where they meet the exterior surface of top 97 and vice versa. By contrast, each of front 101, rear 103, left 105, and right 107 may come to a straight edge with bottom 99. The exterior surface of front 101 may be rounded where it meets the exterior surface of each of left 105 and right 107 and vice versa. Moreover, the exterior surface of rear 103 may be rounded where it meets the exterior surface of left 105 and vice versa. By contrast, the exterior surface of lid 91 may comprise a chamfered corner 145 where rear 103 and right 107 meet. As will be discussed further below, chamfered corner 145 may be used to facilitate the proper orientation of lid 91 relative to base 31.

Lower portion 95 of lid 91 may be a generally rectangular, frame-like structure shaped to include a front 151, a rear 153, a left 155, a right 157, and an open bottom. As will be discussed further below, lid 91 may be appropriately shaped and dimensioned to mate with base 31 in a closure akin to a "tongue-and-groove" style closure. To this end, lower portion 95 of lid 91 may be sized and shaped to be snugly, yet removably, inserted into a top portion of cavity 43 of base 31 in a fashion akin to a plug. Consequently, the corners where front 151 meets left 155 and right 157 and the corner where rear 153 meets left 155 may be rounded to mate with the corresponding interior corners of base 31. Analogously, the corner where rear 153 meets right 157 may be a chamfered corner 160 to mate with an interior 142 of chamfered corner 40.

In addition, to facilitate the mating of lid 91 and base 31, lower portion 95 may comprise a bottom edge 161 that may be angled correspondingly to shelf 51 of base 31. In other words, bottom edge 161 may slope downwardly moving from its periphery inwardly. Consequently, when lid 91 is mounted on base 31, bottom edge 161 may abut or seal against shelf 51.

Referring now to FIGS. 6A through 6E, there are shown various views of the assembled combination of base 31 and lid 91, wherein said combination may be referred to herein as cooler 171. Details of cooler 171 that are discussed elsewhere in this application or that are not critical to an understanding of the invention may be omitted from one or more of FIGS. 6A through 6E and/or from the accompanying description herein or may be shown in one or more of FIGS. 6A through 6E and/or described herein in a simplified manner.

Base 31 and lid 91 may be designed to have one or more complementary features. For example, as can be seen, for example, in FIGS. 6A and 6C, lid 91 and base 31 may be oriented relative to one another so that end 133 of lid 91 and channel 79 of base 31 may be positioned on the same side as one another. This may facilitate the entry of the probe end of the data logger into the interior of base 31. As another example, as can be seen, for example, in FIG. 6B, lid 91 and base 31 may have complementary chamfered corners 145 and 40, respectively, which may facilitate mounting lid 91 on base 31 in only one desired orientation. Additionally, as another example, as can be seen, for example, in FIGS. 6A, 6B and 6D, the three rounded corners 182, 184 and 186 of lid 91 may have a different radius of curvature than the corresponding rounded corners of base 31. This difference may create an overhang of lid 91 relative to base 31 in these three corners, thereby providing an additional location to assist in removing lid 91 from base 31. In addition, as another example, as can be seen, for example, in FIG. 6E, shelf 51 of base 31 and bottom edge 161 of lid 91 may have mating surfaces that may facilitate the loading of dry ice into a lower portion of cavity 43 of base 31.

Figure 7:
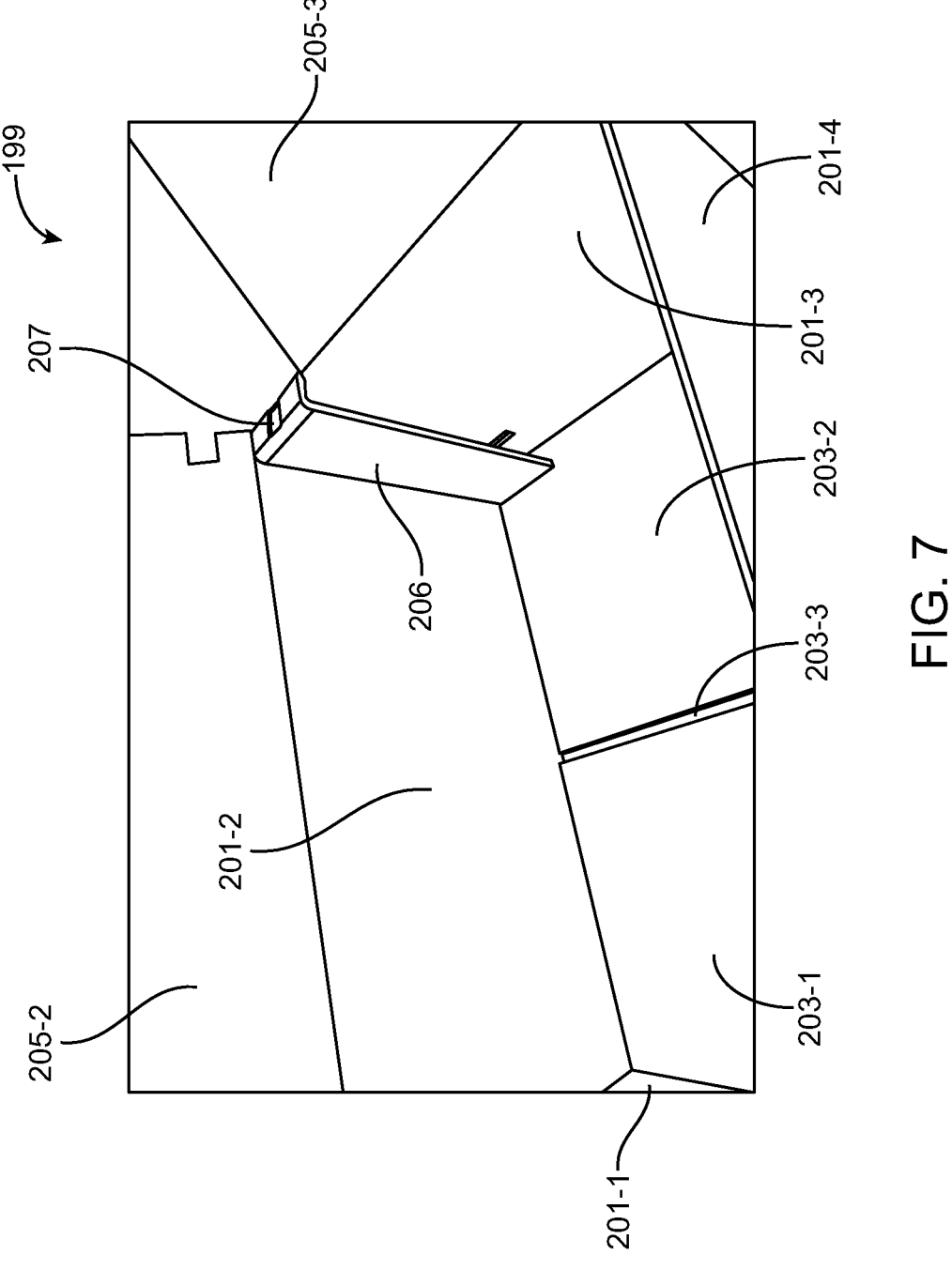
FIG. 7 is a fragmentary perspective view of the product box shown in FIG. 1, the product box being shown in an open state.
Figure 8:
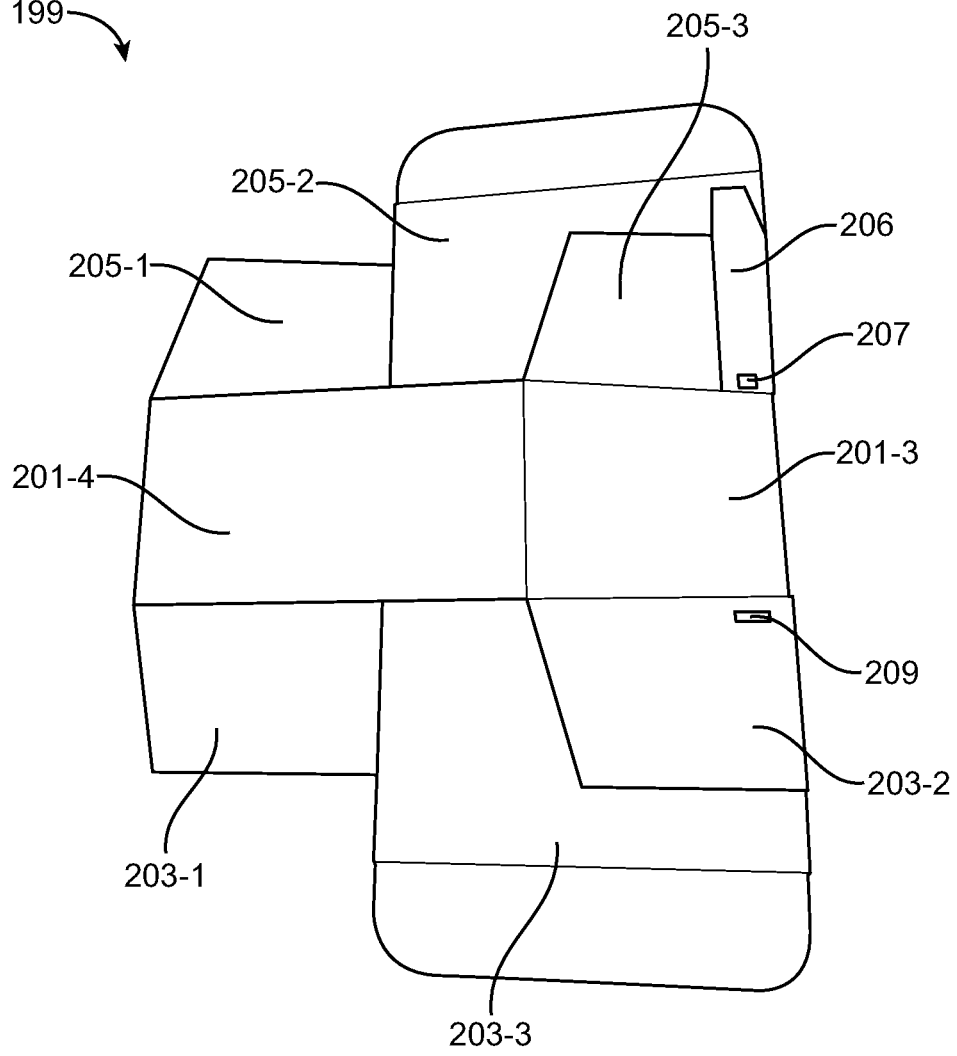
FIG. 8 is a side view of the product box of FIG. 7 shown in a partially disassembled state.

Referring back now to FIG. 1, shipping system 11 may further comprise a product box 199, which is also shown separately in FIGS. 7 and 8. Details of product box 199 that are discussed elsewhere in this application or that are not critical to an understanding of the invention may be omitted from one or more of FIGS. 7 and 8 and/or from the accompanying description herein or may be shown in one or more of FIGS. 7 and 8 and/or described herein in a simplified manner.

Product box 199 may comprise a unitary (i.e., one-piece) structure that may be made of or comprise, for example, corrugated cardboard. Product box 199 may be shaped to include a plurality of side walls 201-1 through 201-4, three bottom flaps 203-1 through 203-3, three top flaps 205-1 through 205-3, and a divider flap 206. Divider flap 206 may be used to define a probe space, separate from the payload, for receiving the probe of a data logger. To this end, divider flap 206 may include an opening 207 through which the probe of the data logger may be inserted. In addition, an opening 209 may be provided in bottom flap 203-1 (or in side wall 201-3) for use in receiving the free end (or tab) of divider flap 206 to keep divider flap 206 in a closed position. As will be discussed further below, product box 199 may be mounted in support 61 so that opening 207 may be proximate to channel 79 of base 31.

Product box 199 preferably has outer dimensions that permit product box 199 to be snugly, yet removably, received in support 61, with the bottom of product box 199 seated on platform 63 and the corners of product box 199 mated with stanchions 65-1 through 65-4. In one exemplary embodiment, the inner dimensions of product box 199 may be 7.625"×4.875"×4.25".

Figure 9:
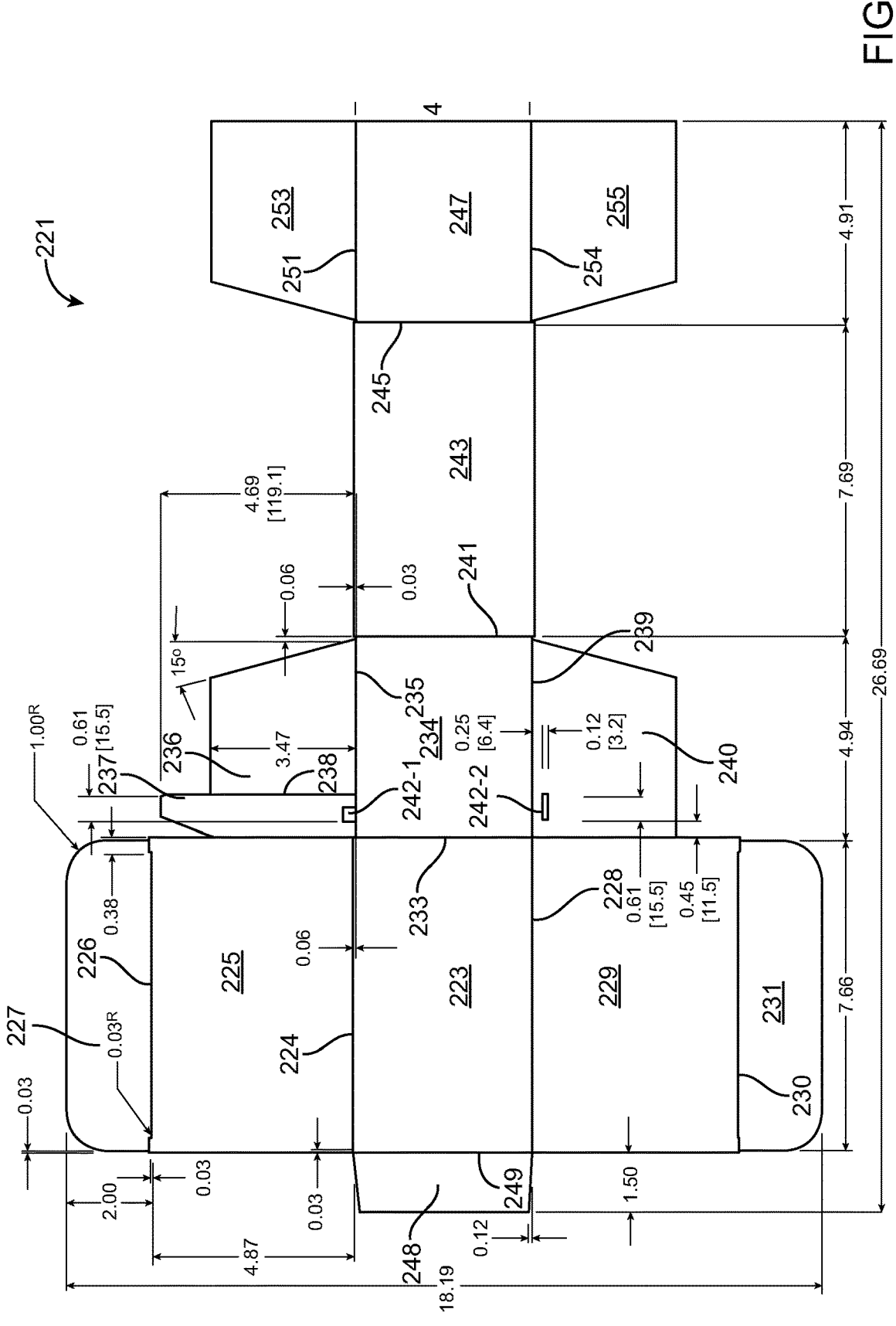
FIG. 9 is a top view of one embodiment of a blank that may be used to construct the product box of FIG. 7.

Referring now to FIG. 9, there is shown one embodiment of a blank that may be used to make product box 199, the blank being constructed according to the present invention and represented generally by reference numeral 221. Details of blank 221 that are discussed elsewhere in this application or that are not critical to an understanding of the invention may be omitted from FIG. 9 and/or from the accompanying description herein or may be shown in FIG. 9 and/or described herein in a simplified manner.

Blank 221 may be shaped to include a panel 223, which may be used to form side wall 201-2. Panel 223 may be connected by a fold line 224 to a panel 225. Panel 225 may be used to form top flap 205-2. Panel 225 may, in turn, be connected by a fold line 226 to a panel 227. Panel 227 may be tucked into the interior of product box 199 to keep top flap 205-2 in a closed position.

Panel 223 may also be connected by a fold line 228 to a panel 229. Panel 229 may be used to form bottom flap 203-3. Panel 229 may, in turn, be connected by a fold line 230 to a panel 231. Panel 231 may be tucked into the interior of product box 199 to keep bottom flap 203-3 in a closed position.

Panel 223 may further be connected by a fold line 233 to a panel 234. Panel 234 may be used to form side wall 201-3. Panel 234, in turn, may be connected by a fold line 235 to panels 236 and 237. Panel 236 may be used to form top flap 205-3, and panel 237 may be used to form divider flap 206. Panels 236 and 237 may be separated from one another by a cut 238. Panel 236 may include an opening 242-1 that may be used to form opening 207. Panel 234 may also be connected by a fold line 239 to a panel 240. Panel 240 may be used to form bottom flap 203-2. Panel 240 may include an opening 242-2 that may be used to form opening 209. Panel 234 may further be connected by a fold line 241 to a panel 243. Panel 243 may be used to form side wall 201-4.

Panel 243, in turn, may be connected by a fold line 245 to a panel 247. Panel 247 may be used to form side wall 201-1. Panel 247 may be coupled via adhesive material (e.g., adhesive tape, glue, etc.) to a panel 248 so that side walls 201-1 and 201-2 may be connected. Panel 248, in turn, may be coupled to panel 223 by a fold line 249.

Panel 247 may also be connected by a fold line 251 to a panel 253. Panel 253 may be used to form top flap 205-1. Panel 247 may also be connected by a fold line 254 to a panel 255. Panel 255 may be used to form bottom flap 203-1.

Exemplary dimensions for blank 221, in inches (with mm shown in parentheses), are shown in FIG. 9.

Figure 10:
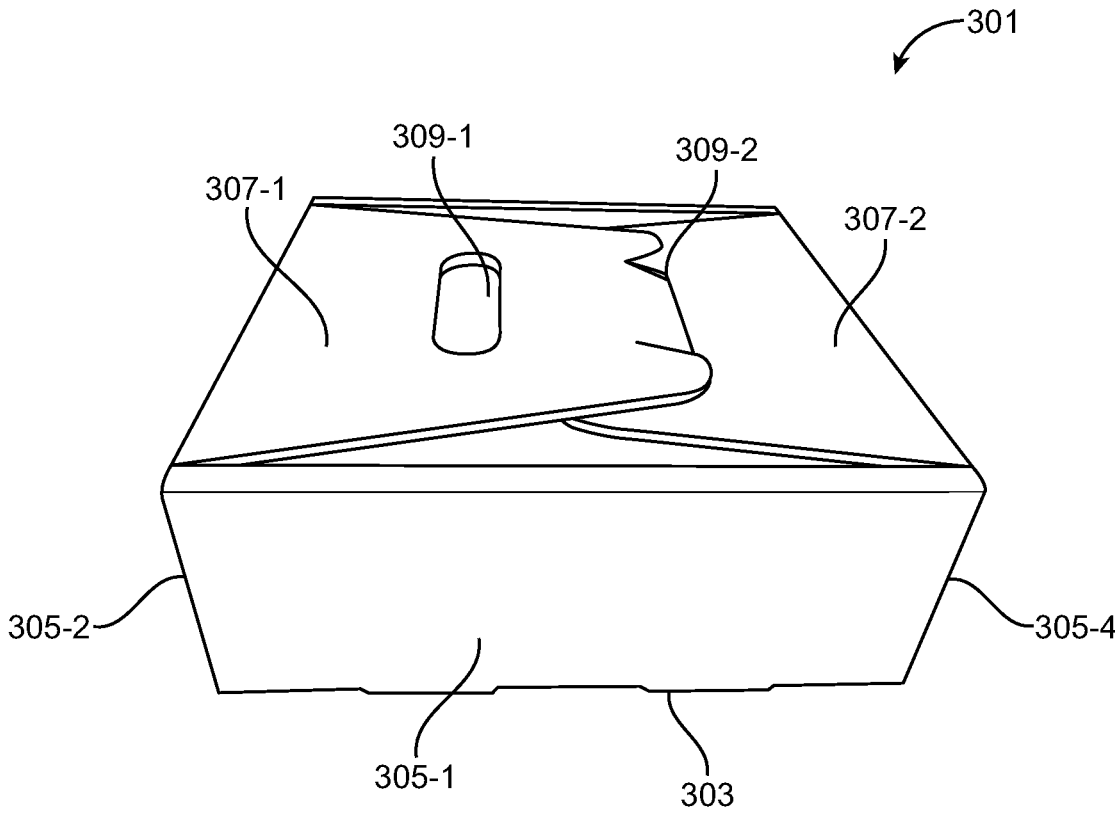
FIG. 10 is an enlarged perspective view of the tray shown in FIG. 1.
Figure 11:
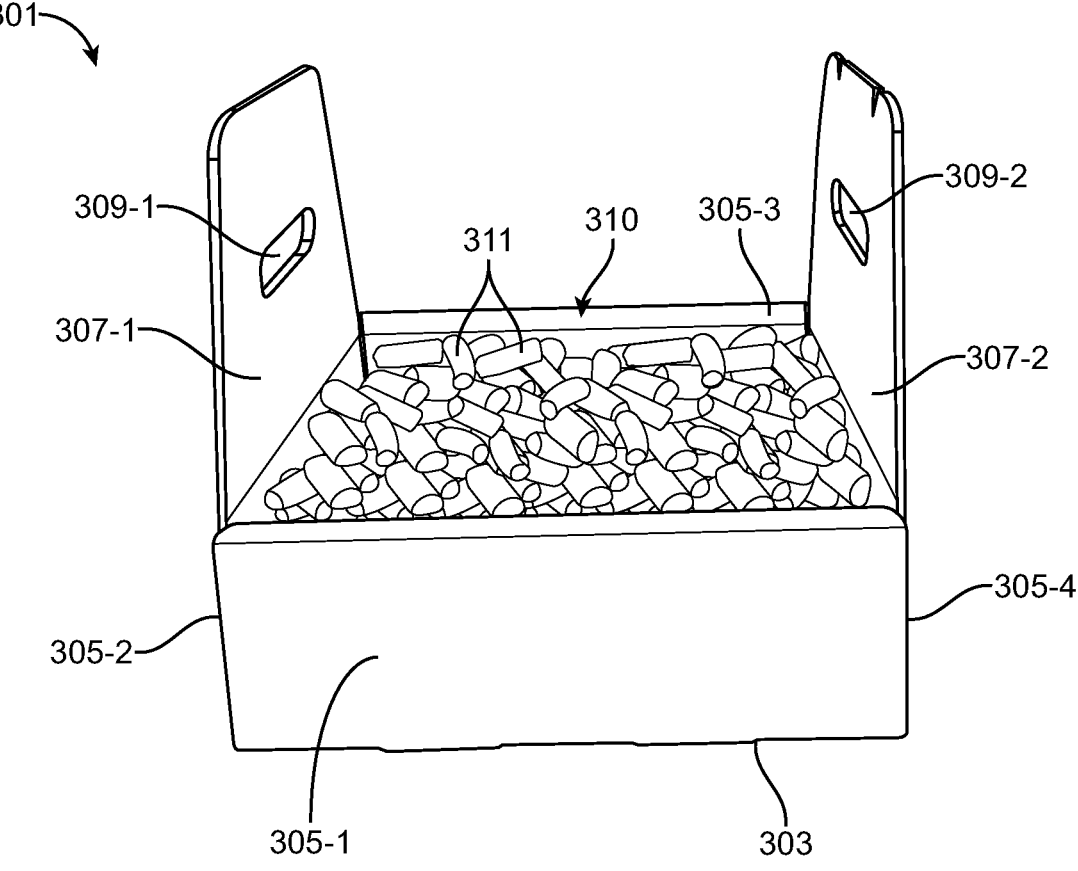
FIG. 11 is a perspective view of the tray of FIG. 10, the tray being shown with its top flaps open and with the tray containing a quantity of dry ice pellets.

Referring back now to FIG. 1, shipping system 11 may further comprise a tray 301, which is also shown in FIGS. 10 and 11. Details of tray 301 that are discussed elsewhere in this application or that are not critical to an understanding of the invention may be omitted from one or both of FIGS. 10 and 11 and/or from the accompanying description herein or may be shown in one or both of FIGS. 10 and 11 and/or described herein in a simplified manner.

Tray 301 may be a unitary (i.e., one-piece) structure and may be made of, for example, corrugated cardboard. Tray 301 may be shaped to include a bottom 303, a plurality of sides 305-1 through 305-4, and a pair of top flaps 307-1 and 307-2, wherein bottom 303, sides 305-1 through 305-4, and top flaps 307-1 and 307-2 may collectively define a cavity 310 that may be used, for example, to receive a quantity of dry ice pellets 311 or the like. As will be discussed further below, each of sides 305-1 and 305-3 may comprise a doubled-over wall. Top flap 307-1 may include an opening 309-1, and top flap 307-2 may include an opening 309-2. Openings 309-1 and 309-2 may be dimensioned and positioned so that the free end of top flap 307-1 may be inserted into opening 309-2 or, alternatively, so that the free end of top flap 307-2 may be inserted into opening 309-1, whereby tray 301 may be maintained in a closed state. Openings 309-1 and 309-2 may also be used as handles to carry tray 301 when in an open state.

Tray 301 may be dimensioned to be snugly, yet removably, received within cavity 43, preferably with the bottom of tray 301 seated directly on top of stanchions 65-1 through 65-4 and with the top of tray 301 flush with the inside perimeter of shelf 51.

Exemplary dimensions for tray 301 may include the following: The inner dimensions of tray 301 may be 10.0"× 10.7". The length of each of top flaps 307-1 and 307-2 may be approximately 7.5". Cavity 310 may be dimensioned to hold approximately 5 kg of dry ice pellets.

Figure 12:
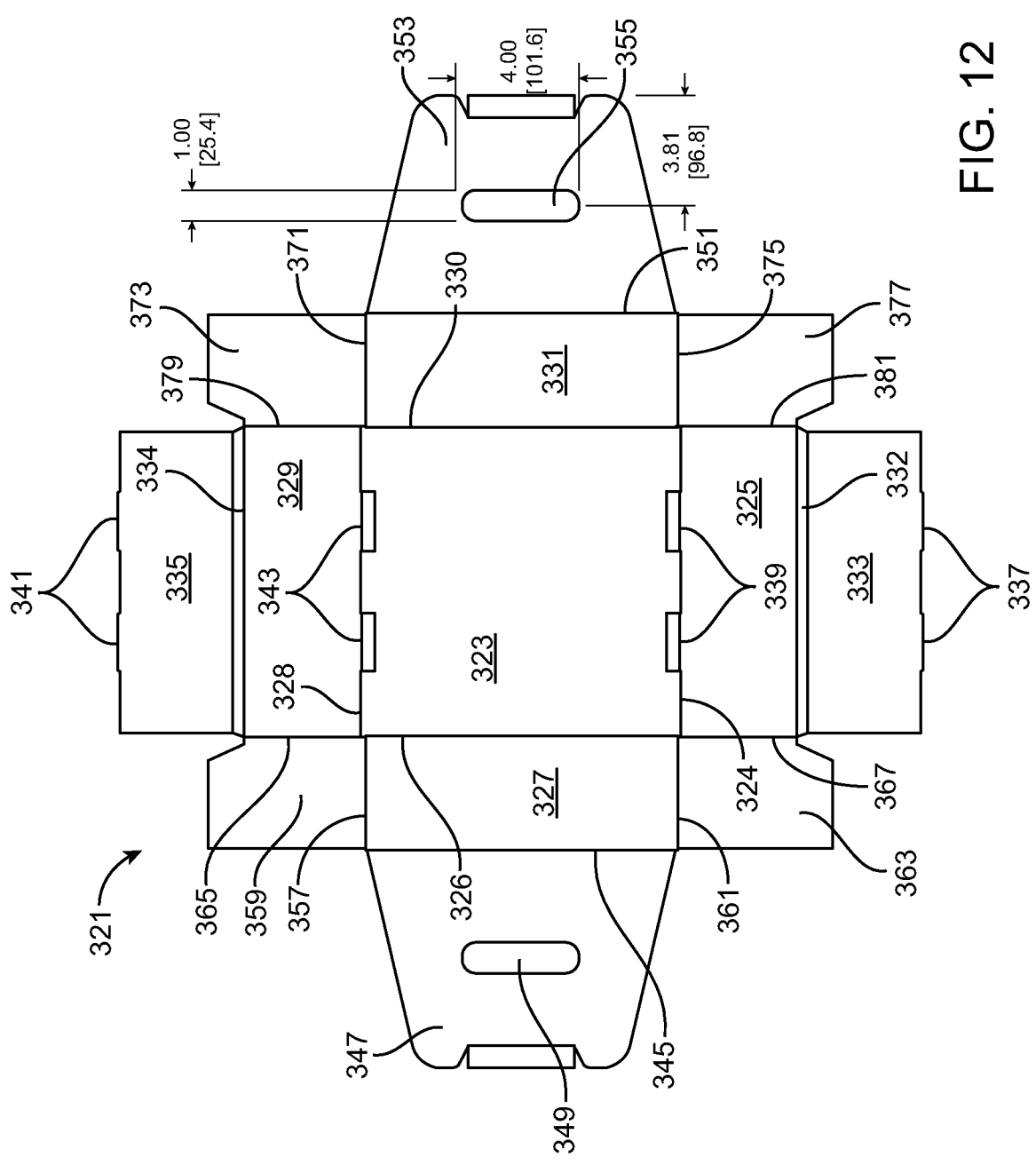
FIG. 12 is a top view of one embodiment of a blank that may be used to construct the tray of FIG. 10.

Referring now to FIG. 12, there is shown one embodiment of a blank that may be used to make tray 301, the blank being constructed according to the present invention and represented generally by reference numeral 321. Details of blank 321 that are discussed elsewhere in this application or that are not critical to an understanding of the invention may be omitted from FIG. 12 and/or from the accompanying description herein or may be shown in FIG. 12 and/or described herein in a simplified manner.

Blank 321 may be shaped to include a panel 323. Panel 323 may be used to form bottom 303 of tray 301. Panel 323 may be connected on a first side by a fold line 324 to a panel 325, on a second side by a fold line 326 to a panel 327, on a third side by a fold line 328 to a panel 329, and on a fourth side by a fold line 330 to a panel 331. Panel 325 may be used to form the inner wall of side 305-1, panel 327 may be used to form side 305-2, panel 329 may be used to form the inner wall of side 305-3, and panel 331 may be used to form side 305-4.

Panel 325 may be connected by a double fold line 332 to a panel 333, and panel 329 may be connected by a double fold line 334 to a panel 335. Panel 333 may be used to form the outer wall of side 305-1, and panel 335 may be used to form the outer wall of side 305-3. The free end of panel 333 may be shaped to include tabs 337 that may engage slots 339 in panel 323 to retain side 305-1 in an assembled state, and the free end of panel 335 may be shaped to include tabs 341 that may engage slots 343 in panel 323 to retain side 305-3 in an assembled state.

Panel 327 may be connected by a fold line 345 to a panel 347. Panel 347 may be used to form handle 307-1 and, to this end, may include an opening 349. In a similar manner, panel 331 may be connected by a fold line 351 to a panel 353. Panel 353 may be used to form handle 307-2 and, to this end, may include an opening 355.

Panel 327 may also be connected on another side by a fold line 357 to a panel 359 and may additionally be connected on yet another side by a fold line 361 to a panel 363. Panel 359, which may be separated from panel 329 by a cut 365, may be used to connect walls 305-2 and 305-3 and, to this end, may be inserted between the inner and outer walls of side 305-3. Panel 363, which may be separated from panel 325 by a cut 367, may be used to connect walls 305-1 and 305-2 and, to this end, may be inserted between the inner and outer walls of side 305-1.

Panel 331 may also be connected on another side by a fold line 371 to a panel 373 and may additionally be connected on yet another side by a fold line 375 to a panel 377. Panel 373, which may be separated from panel 329 by a cut 379, may be used to connect walls 305-3 and 305-4 and, to this end, may be inserted between the inner and outer walls of side 305-3. Panel 377, which may be separated from panel 325 by a cut 381, may be used to connect walls 305-1 and

305-4 and, to this end, may be inserted between the inner and outer walls of side 305-1.

Exemplary dimensions for blank 321, in inches (with mm shown in parentheses), are shown in FIG. 12.

Referring back now to FIG. 1, system 11 may further comprise a data logger 401. Data logger 401, which may be conventional, may comprise a main body 402 and an elongated cord 403. Main body 402 may be appropriately dimensioned to be snugly, yet removably, mounted in recess 121. Cord 403 may terminate in a probe 405 and may be appropriately dimensioned so that, when main body 402 is mounted in recess 121, cord 403 may travel through channel 131, exiting through end 133, then may pass through channel 79 into base 31, and then may be inserted into product box 199 through opening 207.

System 11 may further comprise a bag 411 and a carton 413. Bag 411, which may be, for example, a bubble bag, may be appropriately dimensioned to receive data logger 401. Carton 413, which may be a conventional box made of corrugated cardboard or the like, may be appropriately dimensioned to receive bag 411, whereby data logger 401 may be shipped back to its origin after system 11 has been used. Carton 413 may be stored in a collapsed state until deployed. Preferably, bag 411 and carton 413 may be stored on front portion 109 of lid 91 until deployed.

As noted above, shipping system 11 may further comprise pelletized dry ice 311 or another suitable phase-change or temperature-regulating material. Where pelletized dry ice is used, a first quantity of pelletized dry ice (e.g., approximately 5 kg) may be distributed amongst subcavities 77-1 through 77-4, and a second quantity of pelletized dry ice (e.g., approximately 5 kg) may be positioned within tray 301.

Figure 14:
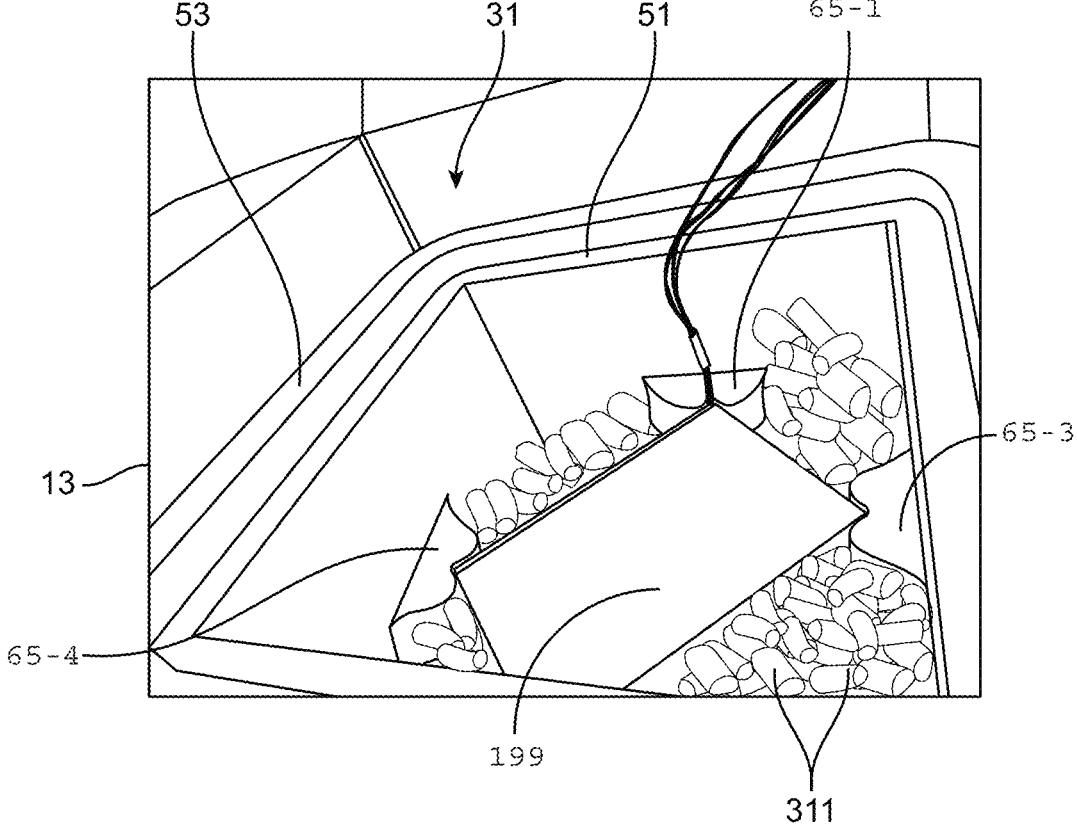
FIG. 14 is a fragmentary top perspective view, showing the assembly of FIG. 13, together with a quantity of dry ice pellets positioned in the base.
Figure 15:
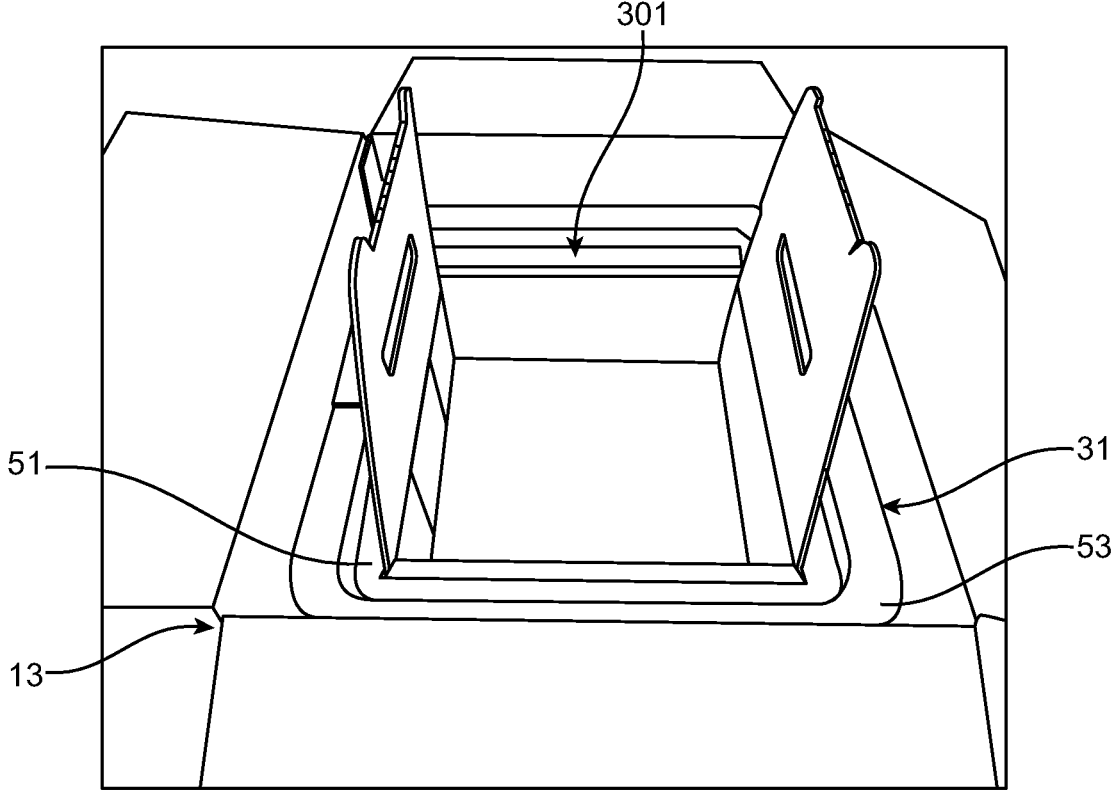
FIG. 15 is a fragmentary top perspective view, showing the assembly of FIG. 14, together with an empty and open tray positioned in the base.
Figure 16:
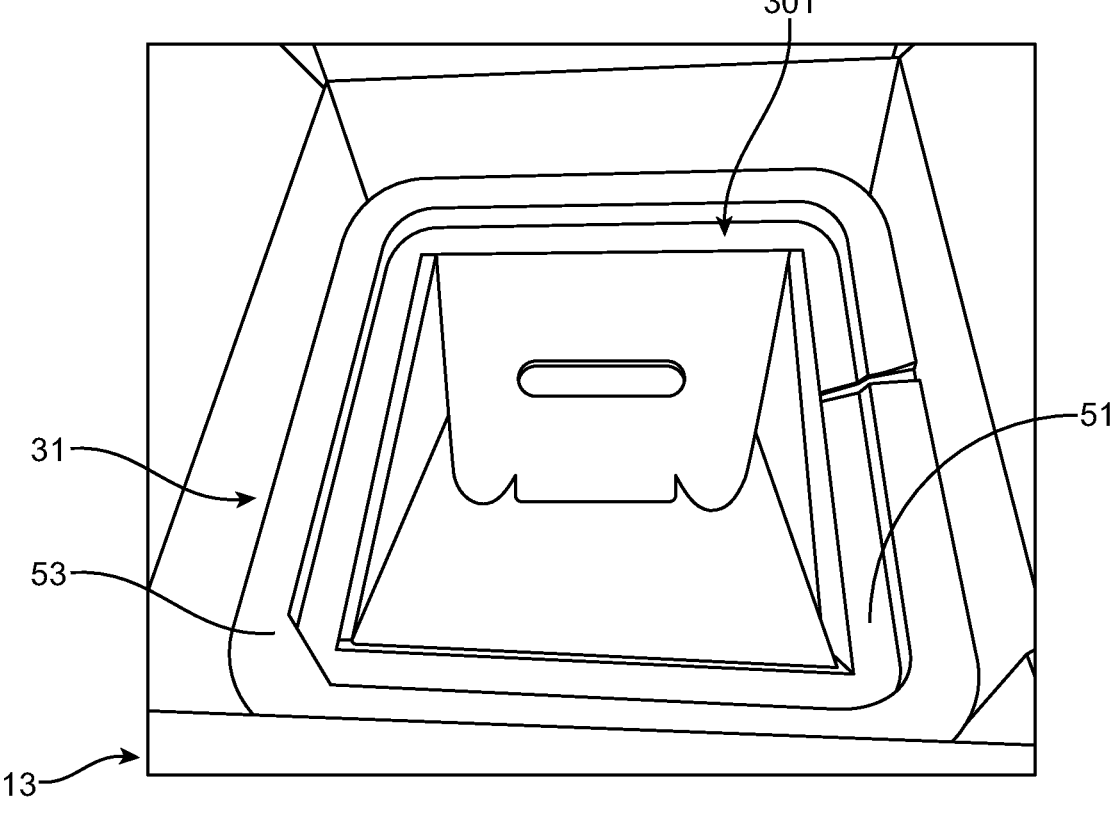
FIG. 16 is a fragmentary top perspective view, showing the assembly of FIG. 15, with the tray in a closed state.
Figure 17:
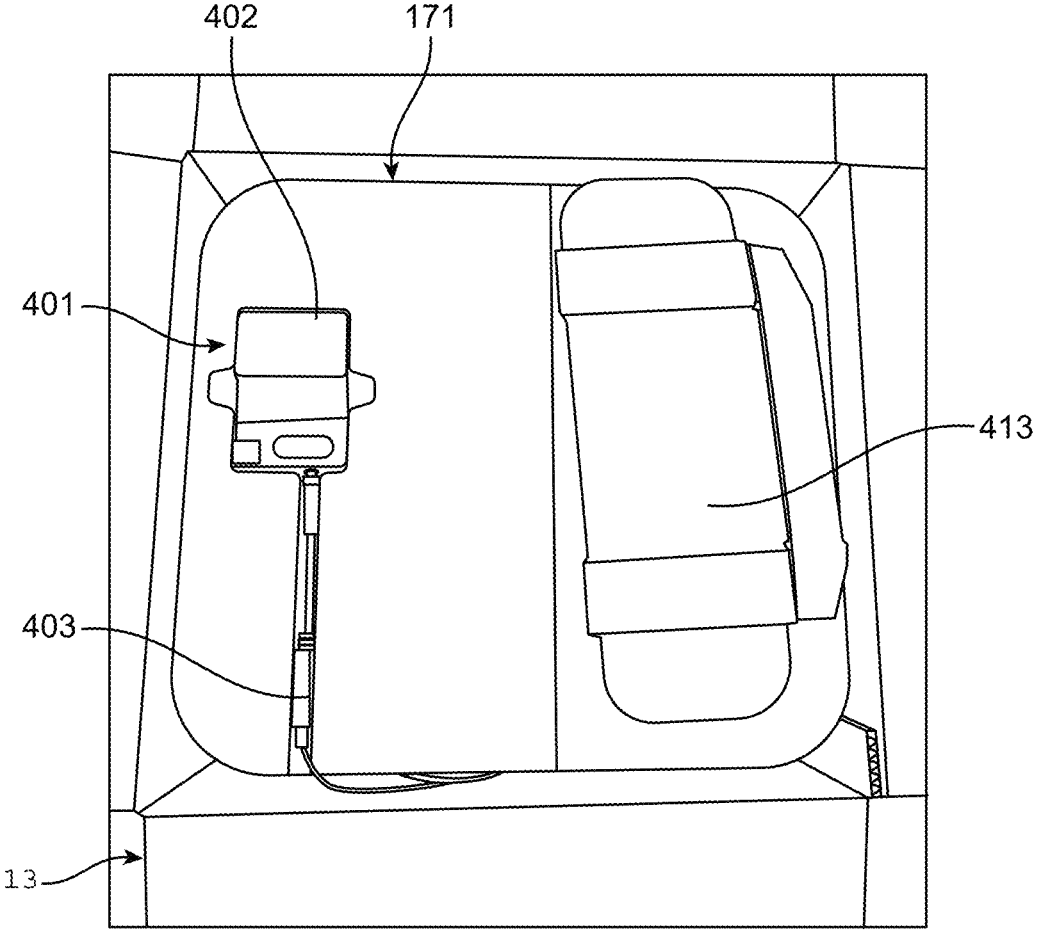
FIG. 17 is a fragmentary top view, showing the assembly of FIG. 16, together with a lid, a data logger mounted on the lid, and return packaging materials positioned on top of the lid.

System 11 may be used as a small, single-use shipping system. One exemplary way in which shipping system 11 may be used is as follows: Product box 199 (together with a payload disposed therewithin) may be mounted in base 31, and base 31 may be positioned within an outer box 13 (see FIG. 13). Next, the probe of data logger 401 may be inserted into opening 207 of product box 199, and dry ice pellets (e.g., approximately 5 kg) may be used to fill subcavities 77-1 through 77-4 (see FIG. 14). In addition, cord 403 of data logger 401 may be fed through channel 79 of base 31, and data logger 401 may be mounted in recess 121 of lid 91. Next, tray 301 may be mounted in base 31 on top of stanchions 65-1 through 65-4 (see FIG. 15). A desired quantity of dry ice pellets 311 (e.g., preferably approximately 5 kg) may be positioned in tray 301, and tray 301 may be closed (see FIG. 16). Next, lid 91, together with main body 402 of data logger 401 and carton 413 (with bag 411 preferably disposed within carton 413) may be mounted on top of base 31 (see FIG. 17). Next, top closure flaps 19-1 through 19-4 may be closed.

The various components of shipping system 11, except for the product load and the pelletized dry ice, may be preconditioned at a temperature of approximately +20° C.±5° C. The product load may be preconditioned at a temperature of approximately −70° C.±5° C., and the pelletized dry ice may be preconditioned at a temperature of −78° C.±5° C.

In summary, some of the objects, features and/or advantages of system 11 may include one or more of the following:

Angled Product Box and Support: Base 31 of cooler 171 may include four stanchions 65-1 through 65-4 molded into the sides of base 31 that hold the product box at a 45° angle relative to the inner walls of base 31. This feature may allow the product box 199 to be positioned at the same orientation with each use and may prevent the product box 199 from being able to rotate. The placement of the product box 199 using stanchions 65-1 through 65-4 may create four sub-cavities 77-1 through 77-4 allowing dry ice pellets 311 to be separated into four areas. The four stanchions 65-1 through 65-4 also may create a shelf for the corrugate tray 301 to be placed on top.

Base 31 also may include a platform 63 between the four stanchions 65-1 through 65-4. The product box 199 may be placed on platform 63, with its corners positioned in stanchions 65-1 through 65-4. Platform 63 may elevate the product box 199. A specified predetermined amount of dry ice pellets 311 (e.g., 5 kg) may fill the four subcavities 77-1 through 77-4. The height of stanchions 65-1 through 65-4 and platform 63 may ensure that the specified predetermined amount of dry ice pellets 311 does not go above the product box 199 or above the top of stanchions 65-1 through 65-4. This also may ensure that the dry ice pellets 311 cover the full height of the product box 199 on all four sides.

Arches or concave recesses 71-1 through 71-4 of platform 63 also may provide additional space for the dry ice pellets 311 to be positioned under the product box 199. After the product box 199 may be placed on platform 63, dry ice pellets 311 may be filled in the four subcavities 77-1 through 77-4. Although the product box 199 may sit on platform 63 and may cover the areas created by recesses 71-1 through 71-4 in platform 63, dry ice pellets 311 may still be able to fill those areas when they are placed in base 31. This may provide additional coverage of dry ice to the bottom face of the product box 199 in addition to the dry ice pellets 311 located along the four sides.

There also may be two cut-outs or recesses 73-1 and 73-2 at the bottom of platform 63 that may provide a thermal break between the top of platform 63 and the outer bottom surface of base 31. Instead of having a continuous solid platform with a large thickness between the top of the platform 63 and the outer bottom surface of the base 31, recesses 73-1 and 73-2 may break the path of thermal resistance while maintaining a sufficient amount of insulation below the product box 199.

Corrugate Tray for Dry Ice: After the product box 199 and dry ice 311 may be placed in base 31, a corrugate tray 301 may be placed on the level shelf that may be created by the four stanchions 65-1 through 65-4 molded into the sides of base 31. The corrugate tray 301 may be filled with a specified predetermined amount of dry ice pellets 311 (e.g., 5 kg). The tray 301 also may include two handles 307-1 and 307-2 that may fold over the dry ice with a feature that may latch one handle into the other, allowing the handles 307-1 and 307-2 to lay flat.

Angled Tongue-and-Groove: Lid 91 and base 31 may include a tongue-and-groove style closure with an angle at a primary mating surface. This is in contrast with standard tongue-and-groove closures, which include a horizontal mating surface as the groove. When dry ice pellets fall on a horizontal mating surface, they remain on the surface and do not allow a lid to close completely, preventing a seal between the lid and base. The downward slope of the angled tongue-and-groove surface of the present invention may serve to assist dry ice pellets in falling into the lower cavity section of base 31 and not staying in place on the surface of the groove (since it is angled). This may reduce the risk of having dry ice pellets getting stuck in the closure and may ensure a good seal between lid 91 and base 31.

Slot/Channel in the Base: Base 31 may include a narrow (e.g., 0.1") slot or channel 79 in a side wall 39 that may allow a data logger probe cord 403 to be guided to the product box 199. Channel 79 may provide a snug fit and may secure the cord 403 in the side wall 39 of base 31, as well as in the surface of the "groove" area of the tongue-and-groove mating surface between lid 91 and base 31. Channel 79 may be located near the corner of base 31 that is opposite chamfered corner 40 of base 31. This design feature may be very useful to the directionality of assembling cooler 171 and all internal components.

Product Box Probe Holder: The corrugate product box 199 that may be placed in base 31 of cooler 171 may include a fold-down corrugate flap 206 that may tuck and be secured in the bottom of the product box 199. The top of the fold-down flap 206 may have a flat surface with a square cut-out 207 in the center. This feature may provide a pocket for a temperature probe 405 of a data logger 401 to be positioned in this specified location. The probe 405 may be fed into the pocket via an opening 207 and may be secured between the wall of the fold-down flap 206 and the inner wall of the product box 199. This placement may restrict movement of the probe 405, which may be important to collect consistent temperature readings form each shipping system.

The product box 199 may be placed into the base 31 (between the four stanchions 65-1 through 65-4) with the opening of the probe holder on the same side as channel 79 in base 31. This alignment may be critical to the design to allow for the cord of the data logger probe to be guided from the product box 199 to the outside of cooler 171 in a consistent location in all shipping solutions.

Cut-outs on the Sides of the Base: Cooler 171 may be placed in a corrugate box 13 with plastic handles 20-1 and 20-2. Base 31 of cooler 171 may have two angled cut-outs 44-1 and 44-2, one on each side. Handles 20-1 and 20-2 may take up a small portion of the volume of the corrugate box 13. The portion of handles 20-1 and 20-2 that is on the inside of box 13 may rest within the cut-outs 44-1 and 44-2 in base 31, allowing the sides of base 31 to be positioned against the inner walls of corrugate box 13. This design feature may allow a snug fit of base 31 and lid 91 with corrugate box 13, without interference of plastic handles 20-1 and 20-2 or a gap between cooler 171 and corrugate box 13.

Data Logger Holder and Channels: Lid 91 of cooler 171 may include a cut-out 121 to hold a data logger 401, which lays flush with the top 97 of lid 91. The top 97 of lid 91 may also include two additional finger-sized cut-outs 123 and 125 on the long sides that may assist a user with removing the data logger 401. There may additionally be three channels 127-1 through 127-3 in the top 97 of lid 91 that may run perpendicular to data logger cut-out 121. Channels 127-1 through 127-3 may be positioned inside data logger cut-out 121 and on top surface 97 of lid 91. Channels 127-1 through 127-3 may provide an air gap which may allow for air flow around the data logger main body 402 to prevent the data logger 401 from reaching extremely low temperatures. Channels 127-1 through 127-3 may be an important design feature as the data logger 401 loses functionality as it reaches temperatures of −20° C. and below.

Data Logger Cord Channel: When the data logger main body 402 is placed in the data logger cut-out 121 of lid 91, the cord 403 of the data logger 401 may be placed in channel 131 located at one end of the data logger cut-out 121. The end 133 of channel 131 located at the left surface 105 of lid 91 may have curved edges to help guide the cord 403 along the left surface 105 of lid 91 (towards channel 79 in base 31). This design feature may help the data logger cord 403 be guided to channel 79 in base 31 so the probe 405 may be placed in the product box 199 inside base 31. A sharp edge (instead of the curved edge) at end 133 would likely become damaged by the pressure of the cord 403 against the sharp corner when the cord 403 is guided to channel 79 in base 31 inside outer box 13.

Recessed Step in the Lid: The lid 91 may have a recessed step or front portion 109 that may be approximately 1 inch lower that the rear portion 111 of lid 91. A small corrugate carton or box 413 may be placed in the recessed step 109, which may allow the small corrugate box 413 to be at the same overall height as the rear portion 111 of lid 91. The additional space created by the recessed step 109 for the small corrugate box 413 to rest in may allow one or more of the top flaps 19-1 through 19-4 of the outer corrugate box 13 to close on the flat surface.

The small corrugate box 413 may contain a bubble bag 411. After system 11 is received by a customer, the customer may place the data logger 401 from lid 91 of cooler 171 in the bubble bag 411. The bubble bag 411 may then be placed in the small corrugate box 413 to be mailed back to the party who sent out system 11.

Lid Handles: The lid 91 may have two handles 141 and 143 that may assist a user with removing lid 91 from base 31. There may be one handle on each side of lid 91.

Lid and Base Mating Directionality: The lid 91 may have three rounded corners 182, 184 and 186 and one chamfered corner 145 on its outer surface. The "tongue" of the tongue-and-groove mating surface between the lid 91 and the base 31 may also include three rounded corner and one chamfered corner 160.

Similarly, the base 31 may include three rounded outer edges and one chamfered outer edge 40. The "groove" of the tongue-and-groove mating surface in base 31 may also include three rounded corners and one chamfered corner 142.

These rounded and chamfered features may provide directionality to lid 91 and base 31, which may allow lid 91 to mate with base 31 in only one specific orientation. In this orientation, the opening of end 133 for the data logger cord may always be on the same side as channel 79 in the base 31.

The directionality created by lid 91 and base 31 mating in this specific singular orientation may be highly advantageous to the design of the overall assembly of system 11. Once the data logger main body 402 is placed in data logger cut-out 121 in lid 91 and the cord 403 is placed in channel 131, the cord 403 may be guided along the side of lid 91 to channel 79 in base 31. The cord 403 may be secured in the channel 79 in left wall 39 and shelf 51. The product box 199 may be oriented with the probe holder opening 207 aligned with channel 79 of base 31, which may allow the probe 405 to be easily secured in the probe holder. Assembling base 31 and lid 91 with their respective chamfered portions in alignment may ensure that end 133 of lid 91 is always on the same side as channel 79 in base 91.

Two direct paths may be created for the data logger cord 403. The positioning of the product box 199 may provide a direct path for the cord 403 of the data logger 401 from channel 79 to the probe holder. Similarly, the orientation of lid 91 on base 31 may provide a direct path for the cord 403 from the end 133 of channel 131 on lid 91 to channel 79 in base 91.

Base 31 and lid 91 may weigh approximately 1.5 lbs. System 11 with cooler 171, corrugate components, and handles may weigh approximately 3.5 lbs. With the addition of 10 kg (22 lbs) of dry ice, the total shipper assembly may weigh approximately 25.5 lbs.

Overhanging Corners of the Lid: The three rounded corners 182, 184 and 186 of lid 91 may have a different radius of curvature than the corresponding rounded edges of base 31. This difference may create an overhang of the lid corners relative to the base 31. This feature may provide the user a secondary location to assist with removing lid 91 from base 31.

Base Wall Thickness: The EPS wall thickness is less in the upper half of base 31 to enable a desired ratio of dry ice in the top versus the bottom.

Figure 18:
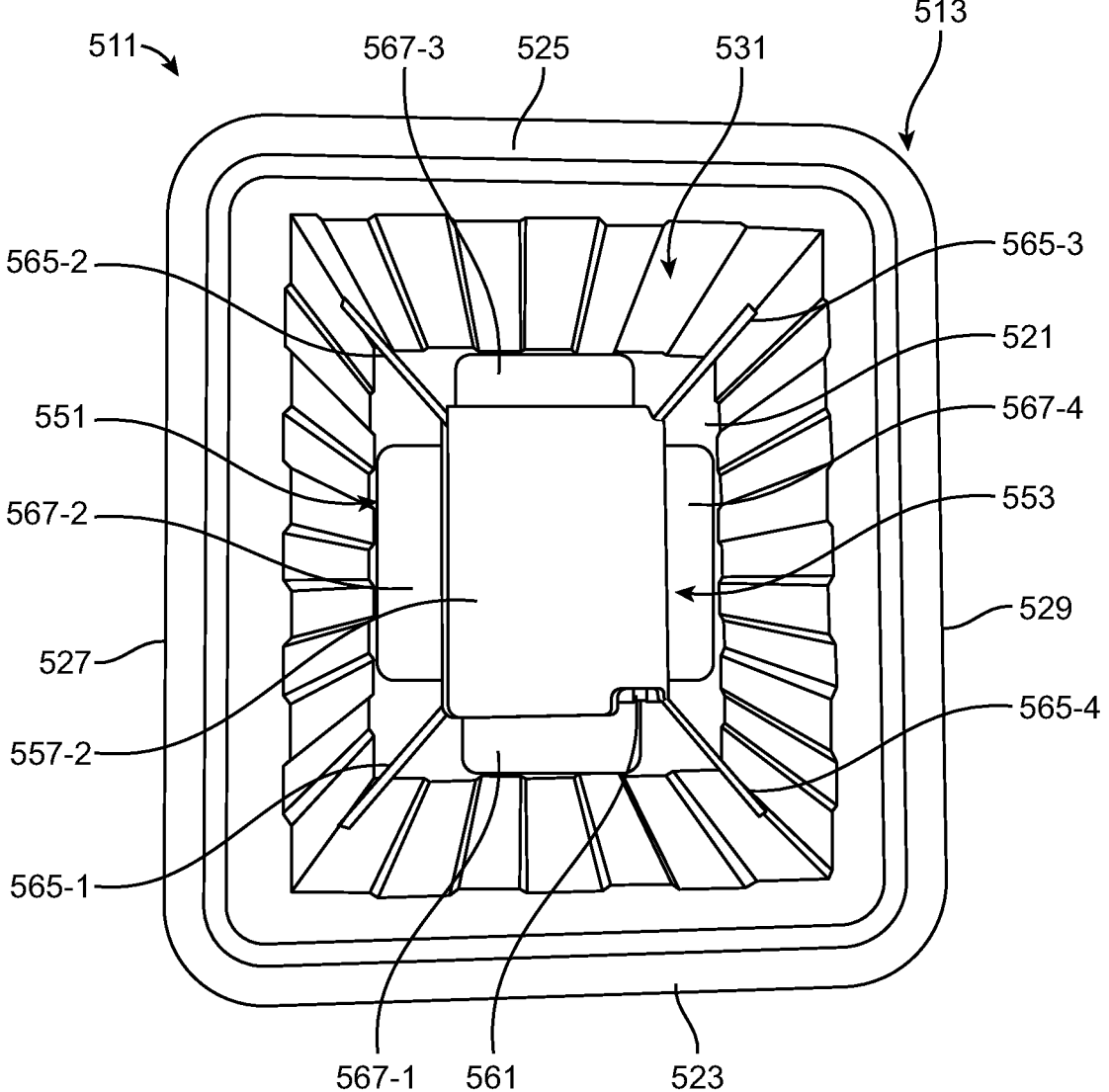
FIG. 18 is a top perspective view of a second embodiment of a system constructed according to the present invention, the system being suitable for storing and/or transporting temperature-sensitive materials, with certain components not being shown for simplicity and clarity.

Referring now to FIG. 18, there is shown a top view of a second embodiment of a system suitable for storing and/or transporting temperature-sensitive materials, the system being constructed according to the present invention and being represented generally by reference numeral 511. Details of system 511 that are discussed elsewhere in this application or that are not critical to an understanding of the invention may be omitted from FIG. 18 and/or from the accompanying description herein or may be shown in FIG. 18 and/or described herein in a simplified manner. For example, amongst other things, the outer box and the lid of system 511 are not shown.

System 511 may be used to maintain a payload within a desired temperature range for an extended period of time, such as several hours up to a few days or longer. In the present embodiment, system 511 may be configured to maintain a parcel-sized payload within a temperature range of about −90° C. to −60° C. for an extended period of time; however, it is to be understood that system 511 need not be limited to parcel-sized payloads and/or that system 511 need not be limited to a temperature range of about −90° C. to −60° C.

Figure 19A:
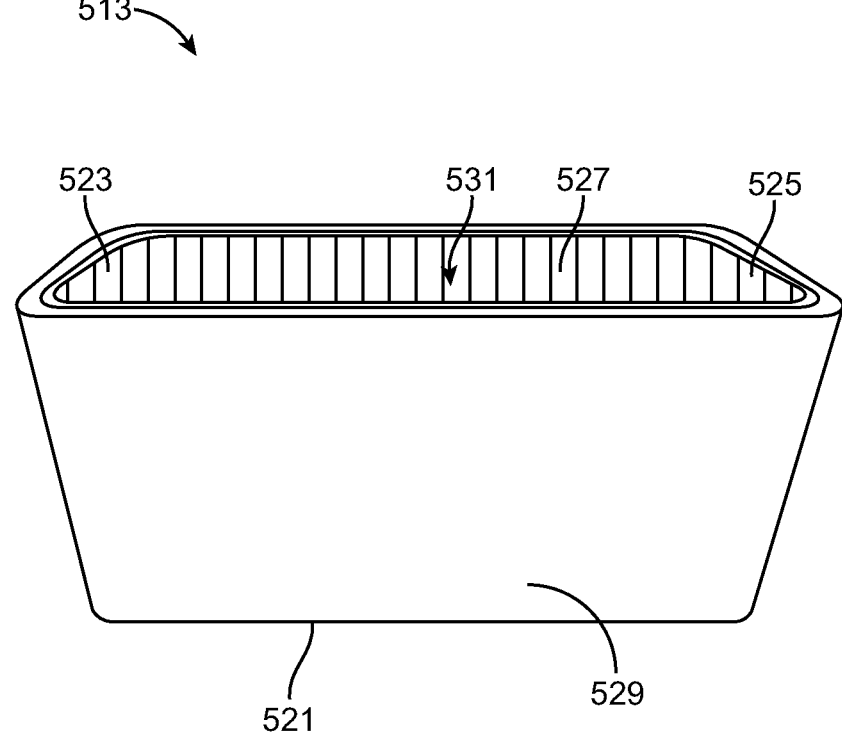
FIGS. 19A and 19B are perspective and top perspective views, respectively, of the base shown in FIG. 18.
Figure 19B:
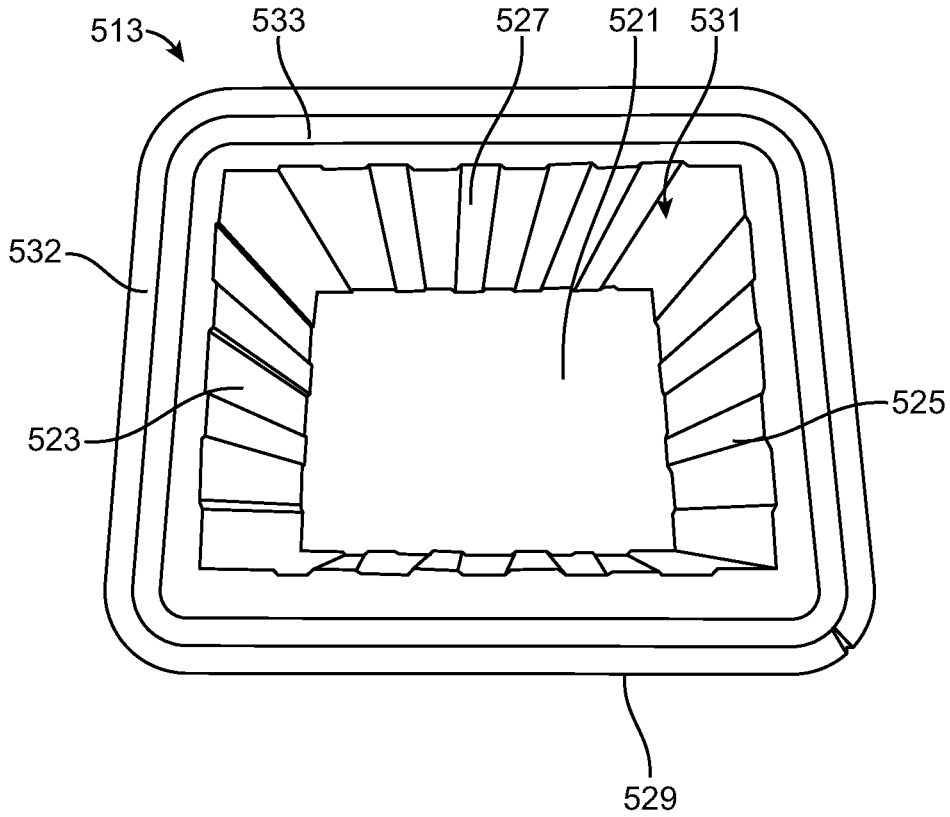
Figure 20:
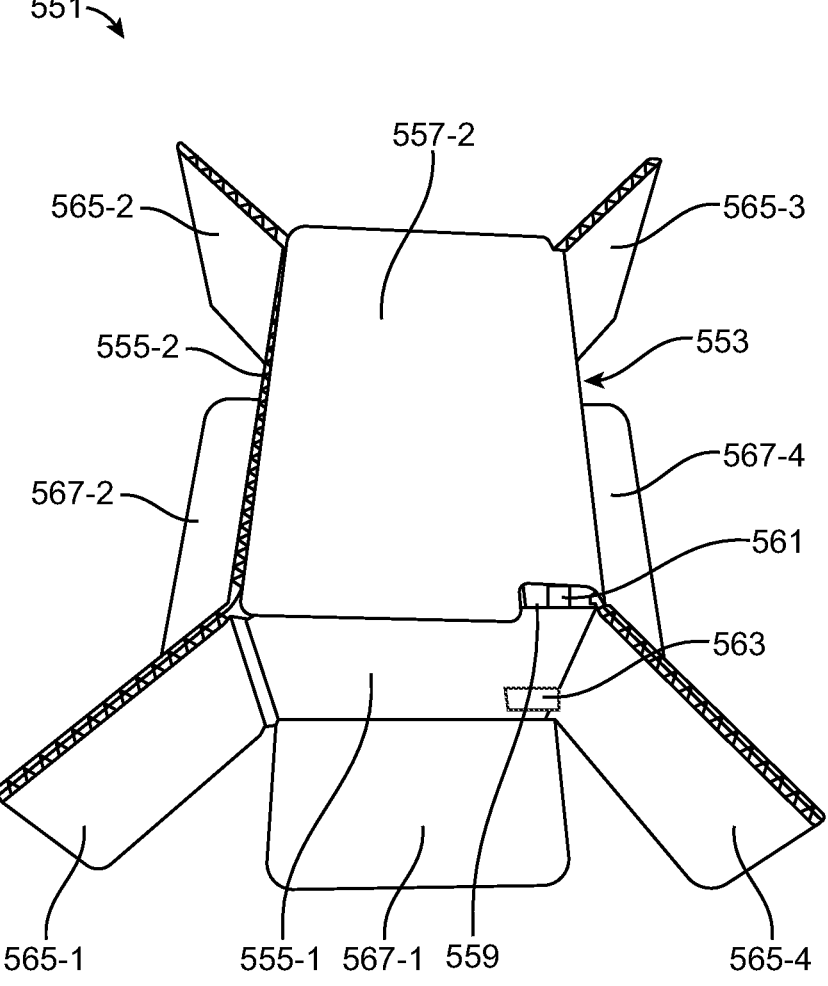
FIG. 20 is an enlarged fragmentary top perspective view of the scaffolding structure shown in FIG. 18.
Figures 21A, 21B:
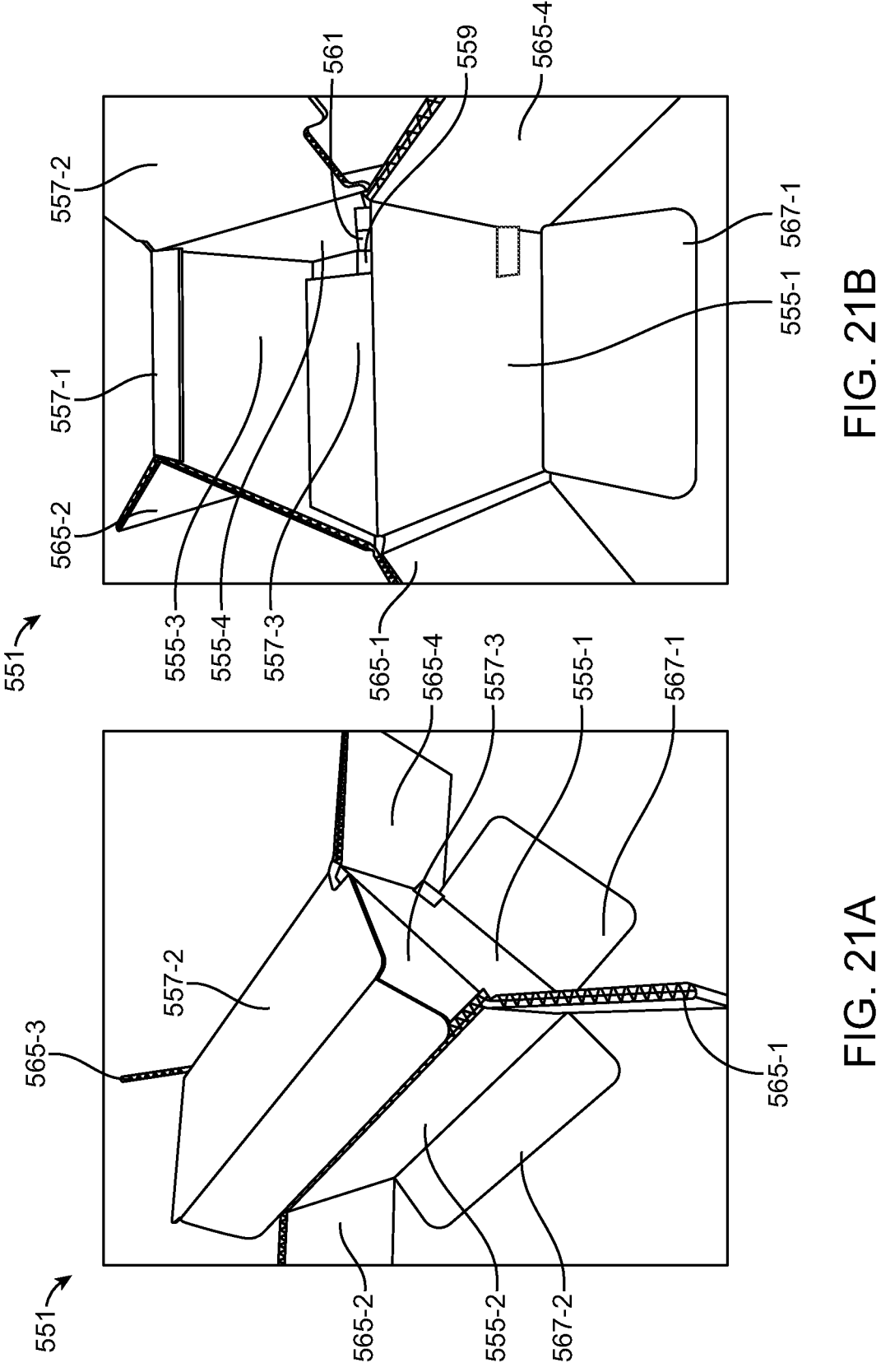
FIGS. 21A and 21B are fragmentary perspective views of the scaffolding structure shown in FIG. 20 with the cover partially open and completely open, respectively.
Figure 21C:
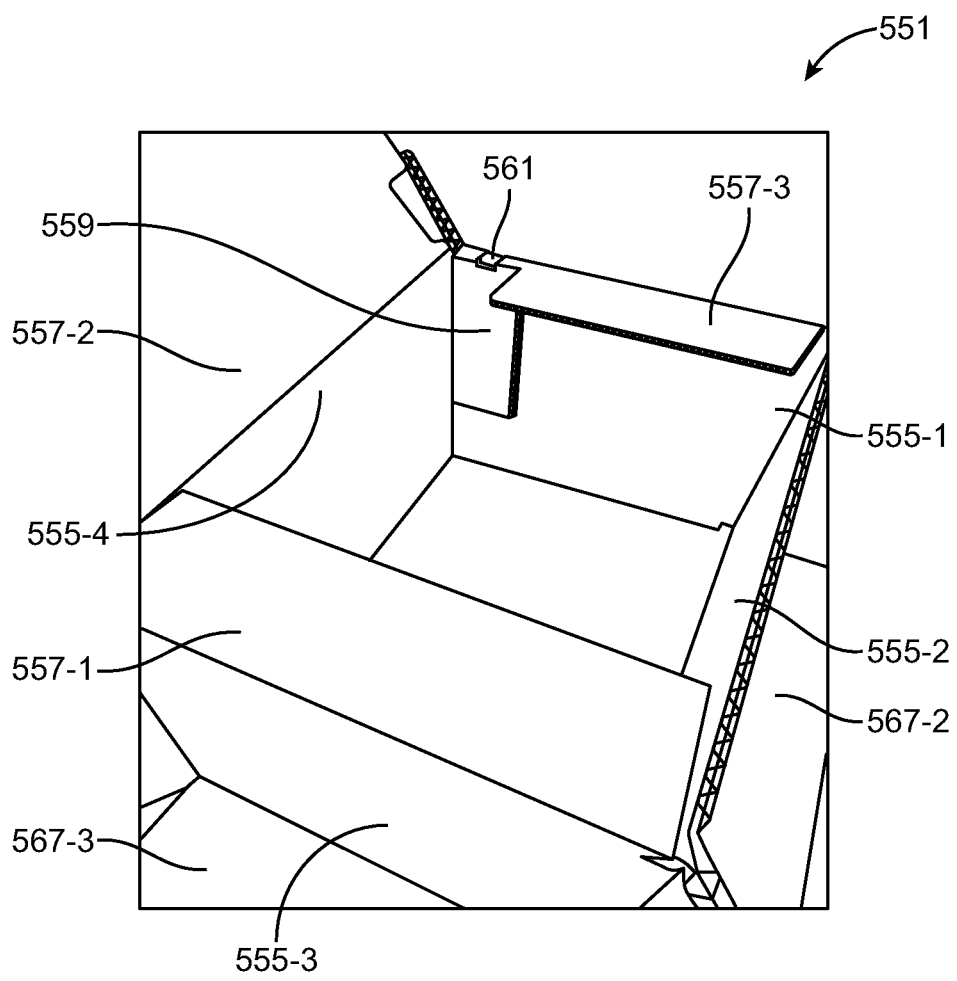
FIG. 21C is a fragmentary rear perspective view of the scaffolding structure shown in FIG. 20.

System 511 may comprise a base 513, which is also shown separately in FIGS. 19A and 19B. Details of base 513 that are discussed elsewhere in this application or that are not critical to an understanding of the invention may be omitted from one or more of FIGS. 18, 19A and 19B and/or from the accompanying description herein or may be shown in one or more of FIGS. 1, 19A and 19B and/or described herein in a simplified manner.

Base 513 may consist of or comprise a thermally-insulating material. Preferably, base 513 is a unitary (i.e., one-piece) structure made of a thermally-insulating material. For example, in the present embodiment, base 513 may consist of or comprise a molded expanded polystyrene (EPS) foam or similar material. Base 513 may be shaped to include a bottom wall 521, a front wall 523, a rear wall 525, a left wall 527, a right wall 529, and an open top. Bottom wall 521 may have a flat and level interior surface. Bottom wall 521, front wall 523, rear wall 525, left wall 527, and right wall 529 may collectively define a cavity 531 that is generally rectangular prismatic in shape and open at its top end. Front wall 523, rear wall 525, left 527, and right wall 529 may collectively form a top edge 532. Top edge 532 may be flat and level, except for a groove 533 that may be used to mate with a lid. Base 513 may exhibit a small draft angle (i.e., front wall 523, rear wall 525, left wall 527, and right wall 529 may taper inwardly slightly from top to bottom), for example, where base 513 is made by injection molding. Front wall 523, rear wall 525, left wall 527, and right wall 529 may have vertical ribs along their respective inner surfaces.

Exemplary dimensions of base 513 may include the following: Inner dimensions of base 513 may be 14.58"× 10.58"×9.13", and outer dimensions of base may be 19.34"× 15.34"×12.07".

System 511 may further comprise a product box or scaffolding structure 551. Scaffolding structure 551, which is also shown separately in FIGS. 20 and 21A through 21C, may consist of or comprise a unitary (i.e., one-piece) structure and may be made of, for example, corrugated cardboard.

Scaffolding structure 551 may be shaped to include a central portion 553. Central portion 553, in turn, may comprise a plurality of side walls 555-1 through 555-4, three top flaps 557-1 through 557-3, a divider flap 559, and an open bottom. Flap 557-2 may be in the form of a tuck-top lid. Divider flap 559 may be used to define a probe space, separate from the payload space, for receiving the probe of a data logger. To this end, divider flap 559 may include an opening 561 through which the probe of the data logger may be inserted. In addition, an opening 563 may be provided in side wall 555-1 for use in receiving the free end of divider flap 559 to keep divider flap 559 in a closed position.

Scaffolding structure 551 may further comprise a plurality of cavity dividers 565-1 through 565-4, each of cavity dividers 565-1 through 565-4 extending out from a different corner of central portion 553. Cavity dividers 565-1 through 565-4 may be appropriately dimensioned to mate with the interior corners of base 513 to divide the volume around central portion 553 into four distinct cavities.

Scaffolding structure 551 may further comprise a plurality of flaps 567-1 through 567-4, each of flaps 567-1 through 567-4 extending out from the bottom of a different side wall 555-1 through 555-4. Flaps 567-1 through 567-4 may be appropriately dimensioned to engage the interior side walls of base 513 to prevent rotation of central portion 553 relative to base 513.

Exemplary dimensions of scaffolding structure 551 may include the following: Inner dimensions of the scaffold may be 7.78"×5.28"×4.85".

Figure 22:
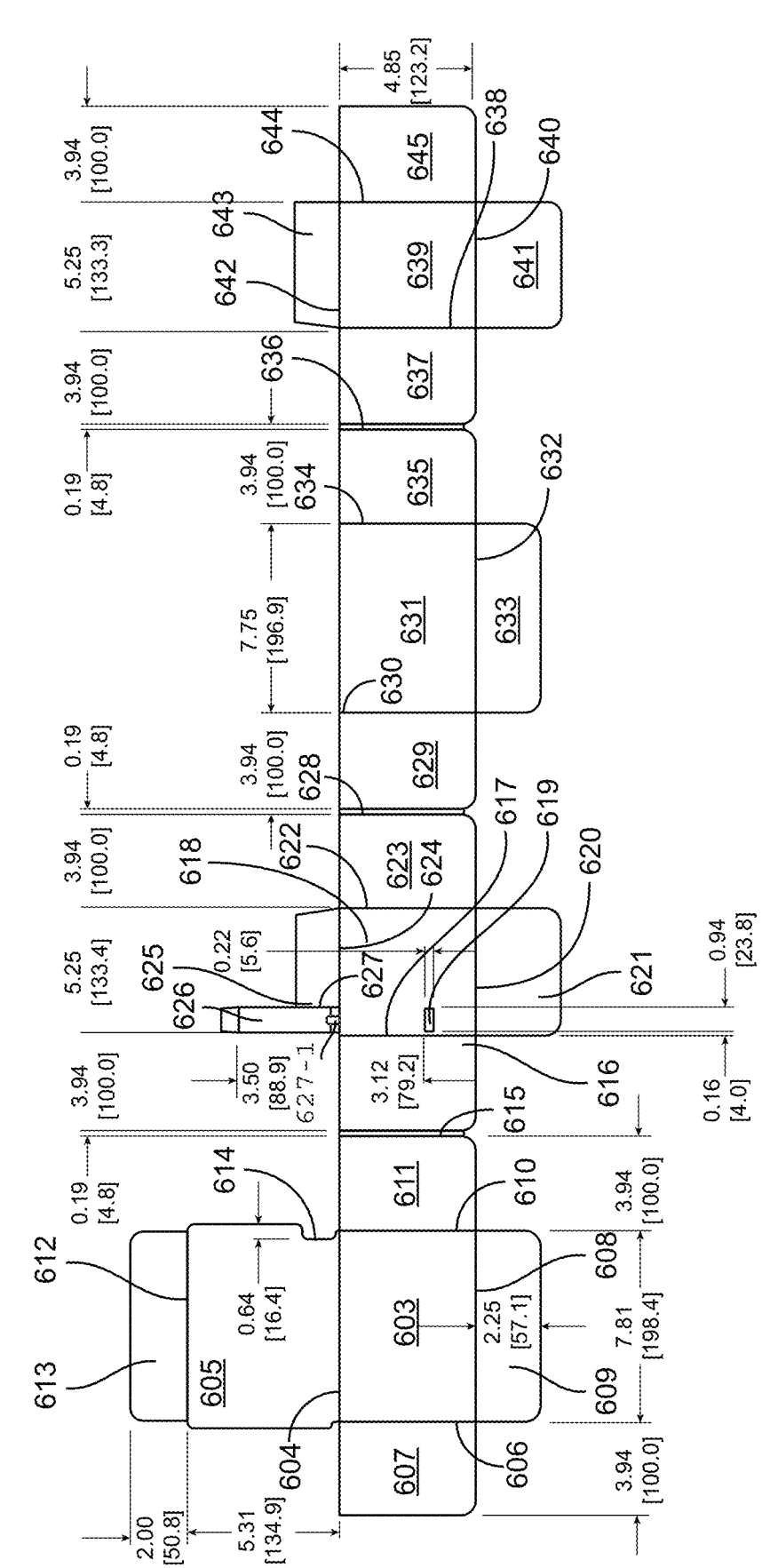
FIG. 22 is a top view of one embodiment of a blank that may be used to construct the scaffolding structure of FIG. 18.

Referring now to FIG. 22, there is shown one embodiment of a blank that may be used to make scaffolding structure 551, the blank being constructed according to the present invention and represented generally by reference numeral 601. Details of blank 601 that are discussed elsewhere in this application or that are not critical to an understanding of the invention may be omitted from FIG. 22 and/or from the accompanying description herein or may be shown in FIG. 22 and/or described herein in a simplified manner.

Blank 601 may be shaped to include a panel 603. Panel 603 may be used to form side wall 555-4 of scaffolding structure 551. Panel 603 may be connected on a first side by a fold line 604 to a panel 605, on a second side by a fold line 606 to a panel 607, on a third side by a fold line 608 to a panel 609, and on a fourth side by a fold line 610 to a panel 611. Panel 605, in turn, may be connected by a fold line 612 to a panel 613. Panels 605 and 613 may be used collectively to form flap 557-2. Panel 605 may include a recess 614, which may be provided so as not to cover opening 561 when flap 557-2 is closed. Panel 607 may be used to form one of the panels of divider 565-3. Panel 609 may be used to form flap 567-4. Panel 611 may be used to form one of the panels of divider 565-4.

Panel 611 may also be connected by a fold line 615 to a panel 616. Panel 616 may be used to form the other panel of divider 565-4. Panel 616, in turn, may be connected by a fold line 617 to a panel 618. Panel 618 may be used to form side wall 555-1, and panel 618 may include an opening 619 that may be used to form opening 563.

Panel 618 may be connected on another side by a fold line 620 to a panel 621, may be connected on yet another side by a fold line 622 to a panel 623, and may be connected on still yet another side by a fold line 624 to panels 625 and 626. Panels 625 and 626 may be separated by a cut 627. Panel 621 may be used to form flap 567-1, panel 623 may be used to form one panel of divider 565-1, and panels 625 and 626 may be used to form flap 557-3 and flap 559, respectively. An opening 627-1 may be provided in panel 626 to form opening 561.

Panel 623 may be connected on another side by a fold line 628 to a panel 629. Panel 629 may be used to form the other panel of divider 565-1. Panel 629, in turn, may be connected on another side by a fold line 630 to a panel 631. Panel 631 may be used to form side wall 555-2.

Panel 631 may be connected on another side by a fold line 632 to a panel 633 and may be connected on yet another side by a fold line 634 to a panel 635. Panel 633 may be used to form flap 567-2, and panel 635 may be used to form one panel of divider 565-2. Panel 635, in turn, may be connected on another side by a fold line 636 to a panel 637. Panel 637 may be used to form the other panel of divider 565-2.

Panel 637 may be connected on another side by a fold line 638 to a panel 639. Panel 639 may be used to form side wall 555-3. Panel 639, in turn, may be connected on another side by a fold line 640 to a panel 641, may be connected on still another side by a fold line 642 to a panel 643, and may be connected on still another side by a fold line 644 to a panel 645. Panel 641 may be used to form flap 567-3, panel 643 may be used to form flap 557-1, and panel 645 may be used to form one of the panels of divider 565-3.

Exemplary dimensions for blank 601, in inches (with mm shown in parentheses), are shown in FIG. 22.

In summary, some of the objects, features and/or advantages of system 511 may include one or more of the following:

System 511 may include a corrugate scaffolding structure 551 that may be placed in the center of base 513. The center portion 553 of the scaffold 551 may be a rectangular structure with a tuck-top lid 557-2; there is preferably no material at the bottom of the rectangular structure. There may be four double-thickness corrugate dividers 565-1 through 565-4 that may extend from the corners of the center portion 553. When the scaffold 551 is placed in the base 513, these dividers 565-1 through 565-4 may extend from the center portion 553 to the corners, creating four separate cavities in the base 513 where dry ice pellets may be filled. A product load may be placed inside the void space in the center portion 553 of the scaffold 551. The scaffold 551 may include four additional flaps 567-1 through 567-4 extending from the bottom of the side walls 555-1 through 555-4 of the center portion 553. The additional flaps 567-1 through 567-4 may sit along the four interior walls of the base 513 and may prevent the scaffold 551 from rotating inside the base 513.

The scaffold 551 also may include a probe holder located in the corner of the product load space. The probe holder may comprise a fold-down corrugate flap 559 that may tuck in and be secured in side wall 555-1 of scaffold 551. The top of the fold-down flap 559 has a flat surface with a square opening or cut-out 561 in the center. This feature provides a pocket for a temperature probe of a data logger to be positioned in this specified location, similar to that discussed above. The probe may be fed into the pocket via opening 561 and may be secured between the wall of fold-down flap 559 and the inner wall of the product box.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A system suitable for storing and/or transporting temperature-sensitive materials, the system comprising: (a) an insulated container, the insulated container comprising a plurality of walls, the plurality of walls being molded together and collectively defining a cavity and a support, the cavity comprising a bottom surface having a set of diametrically opposed corners, the support being constructed to removably receive a product box in the cavity and to orient the product box in the cavity at an angle rotationally offset from the cavity, the support being positioned within the cavity and comprising a platform, the platform being elevated relative to the bottom surface of the cavity and being oriented diagonally in a direction extending between the set of diametrically opposed corners; and (b) the product box for holding the temperature-sensitive materials, the product box being removably seated on the platform in the cavity of the insulated container, wherein the insulated container further comprises a shelf bounding, in part, the cavity, the shelf sloping inwardly and angling downwardly towards an interior portion of the cavity moving from an exterior edge of the shelf to an interior edge of the shelf, the interior edge of the shelf being positioned higher than an entirety of the product box.

2. The system as claimed in claim 1 wherein the insulated container comprises a base and wherein the plurality of walls comprises a bottom wall of the base and four side walls of the base.

3. The system as claimed in claim 2 wherein the base is made of an insulating foam.

4. The system as claimed in claim 3 wherein the insulating foam is an expanded polystyrene foam.

5. The system as claimed in claim 1 wherein the support further comprises four stanchions, wherein the four stanchions are disposed within the cavity and extend upwardly from the bottom surface of the cavity, with two of the four stanchions located on opposite sides of one of the diametrically opposed corners and with another two of the four stanchions located on opposite sides of the other one of the diametrically opposed corners, and wherein the product box is seated directly on the platform.

6. The system as claimed in claim 5 wherein the platform is shaped to include a top surface and at least one side surface, wherein the at least one side surface includes at least one concave recess, and wherein the at least one concave recess is at least partially positioned directly under the product box.

7. The system as claimed in claim 1 wherein the support is oriented so that the angle rotationally offset from the cavity is approximately 45 degrees.

8. The system as claimed in claim 5 wherein the product box is shaped to have four corner edges and wherein each of the four stanchions is shaped to removably receive a different one of the four corner edges of the product box.

9. The system as claimed in claim 8 wherein each of the four stanchions has a top end and wherein the top ends of the stanchions are substantially flush with a top surface of the product box.

10. The system as claimed in claim 5 wherein the platform is shaped to include a top surface and wherein at least one recess is provided in the top surface of the platform.

11. The system as claimed in claim 1 wherein the support and the product box divide at least a portion of the cavity into four distinct subcavities.

12. The system as claimed in claim 11 further comprising a quantity of phase-change material disposed in each of the four distinct subcavities.

13. The system as claimed in claim 12 wherein the phase-change material comprises dry ice pellets.

14. The system as claimed in claim 1 further comprising a tray for holding phase-change material, the tray being removably received in the cavity.

15. The system as claimed in claim 14 wherein the tray is seated on top of the support.

16. The system as claimed in claim 14 wherein the tray comprises a bottom, four sides, and two handles, wherein the two handles function as top flaps, each handle having an opening and a free end, and wherein the two handles are mateable with one another by inserting the free end of one handle into the opening of the other handle or vice versa.

17. The system as claimed in claim 2 wherein the insulated container further comprises a lid, the lid being removably mounted on the base to close the cavity.

18. The system as claimed in claim 17 wherein the base comprises a shelf that slopes inwardly and downwardly away from each of the plurality of walls towards an opposing one of the plurality of walls, wherein the shelf has an interior edge that is positioned higher than an entirety of the product box, and wherein the lid comprises a plug, the plug having a sloped bottom surface that mates with the shelf.

19. The system as claimed in claim 17 further comprising a data logger, wherein the data logger comprises a main body and a cord terminating in a probe, and wherein the lid comprises a top surface having a recess for removably receiving the main body of the data logger.

20. The system as claimed in claim 19 wherein the top surface of the lid further comprises at least one channel perpendicular to the recess to provide an air gap that allows for air flow around the main body of the data logger.

21. The system as claimed in claim 19 wherein the top surface of the lid further comprises a channel for removably receiving the cord.

22. The system as claimed in claim 21 wherein the channel for removably receiving the cord terminates in an opening having curved edges.

23. The system as claimed in claim 19 further comprising packaging for returning the data logger and wherein the top surface of the lid comprises a recess for storing the packaging prior to its deployment.

24. The system as claimed in claim 17 wherein the lid comprises at least one recess dimensioned to serve as a handle.

25. The system as claimed in claim 17 wherein each of the lid and the base has a single chamfered corner and wherein the chamfered corners of the lid and the base mate with one another.

26. The system as claimed in claim 17 wherein the lid has at least one corner that extends beyond a corresponding corner of the base.

27. The system as claimed in claim 2 wherein the base is shaped to include a channel that extends downwardly from a top surface of the base and inwardly from an exterior surface of the base into the cavity and wherein the channel is dimensioned for receiving a data logger cord.

28. The system as claimed in claim 1 wherein the product box comprises a pocket for receiving a temperature probe of a data logger.

29. The system as claimed in claim 28 wherein the base is shaped to include a channel that extends downwardly from a top surface of the base and inwardly from an exterior surface of the base and transversely through the base into the cavity, wherein the channel is dimensioned for receiving a data logger cord, and wherein the pocket of the product box is aligned with the channel.

30. The system as claimed in claim 1 further comprising an outer box and wherein the insulated container is removably received within the outer box.

31. The system as claimed in claim 30 wherein the outer box comprises at least one handle and wherein the insulated container is shaped to include at least one recess for accommodating the at least one handle.

32. The system as claimed in claim 1 wherein the product box is seated directly on top of the support.

\* \* \* \* \*